(12) United States Patent
Yamane et al.

(10) Patent No.: US 7,108,907 B1
(45) Date of Patent: Sep. 19, 2006

(54) CELLULOSE DOPE AND METHOD FOR PRODUCING THE SAME

(75) Inventors: Chihiro Yamane, Fuji (JP); Kunihiko Okajima, Fuji (JP); Seiji Shimizu, Kurashiki (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 09/546,665

(22) Filed: Oct. 25, 2000

(30) Foreign Application Priority Data

Nov. 8, 1999 (JP) ............................ 11-316509

(51) Int. Cl.
*D04H 1/00* (2006.01)
*D04H 3/00* (2006.01)
*B32B 23/00* (2006.01)

(52) U.S. Cl. .................... 428/292.1; 428/364; 428/393; 106/163.1

(58) Field of Classification Search ............. 428/292.1, 428/393, 364; 106/163.1
See application file for complete search history.

(56) References Cited

U.S. PATENT DOCUMENTS

| 2,703,270 A | 3/1955 | Studer et al. |
| 3,395,140 A * | 7/1968 | Williams |

(Continued)

FOREIGN PATENT DOCUMENTS

| DE | 260 167 A3 | 9/1988 |
| EP | 0 515 208 A2 | 11/1992 |
| EP | 0 918 101 A1 | 5/1999 |
| JP | 62-240328 | 10/1987 |
| JP | 62-240329 | 10/1987 |
| JP | 4-348130 | 12/1992 |
| JP | 7-278941 | 10/1995 |
| JP | 9-124702 | 5/1997 |

(Continued)

OTHER PUBLICATIONS

Copy of Supplementary European Search Report dated Apr. 6, 2004.

*Primary Examiner*—Rena Dye
*Assistant Examiner*—Camie Thompson
(74) *Attorney, Agent, or Firm*—Dickstein, Shapiro, LLP.

(57) ABSTRACT

A cellulose dope comprising an aqueous sodium hydroxide solution and cellulose dissolved in the solution, wherein the cellulose dope has a sodium hydroxide concentration ($C_{Na}$) of from 6.5 to 11% by weight, a cellulose content (Cc) of from 5 to 10% by weight, a viscosity average degree of polymerization (DPc) of the cellulose of from 350 to 1,200 and a cellulose dissolution ratio (Sc) of 99.0% by weight or more, and wherein the zero-shear viscosity ($\eta_0$) and the cellulose content (Cc) of the cellulose dope and the viscosity average degree of polymerization (DPc) of the cellulose in the cellulose dope satisfy the following formula (1):

$$\eta_0 = kCc^m \times DPc^p \quad (1)$$

wherein:

$\eta_0$ represents the zero-shear viscosity (mPa·s) of the cellulose dope,

Cc represents the cellulose content (% by weight) of the cellulose dope,

DPc represents the viscosity average degree of polymerization of the cellulose in the cellulose dope, $k = 3.9 \times 10^{-11}$, m is a number of from 5 to 7, and p is a number of from 3 to 4.

22 Claims, 3 Drawing Sheets

U.S. PATENT DOCUMENTS 3,758,458 A * 9/1973 Dyer
3,915,959 A * 10/1975 Goheen et al. .............. 260/233
4,368,078 A * 1/1983 Angelini et al. ............ 106/164
4,535,028 A * 8/1985 Yokogi et al. ............... 428/398
4,634,470 A * 1/1987 Kamide et al. .......... 106/163.1
5,123,962 A * 6/1992 Komuro et al. ........ 106/164.01
5,605,567 A * 2/1997 Lancaster .............. 106/163.01
6,080,277 A * 6/2000 Oberkofler et al. ...... 162/157.6
6,541,627 B1 * 4/2003 Ono et al. .................... 536/56

FOREIGN PATENT DOCUMENTS

| JP | 9-316101 | 12/1997 |
| JP | 09316101 | * 12/1997 |

* cited by examiner

CELLULOSE DOPE AND METHOD FOR PRODUCING THE SAME

BACKGROUND OF THE INVENTION

1. Field of the Invention

The present invention relates to a cellulose dope. More particularly, the present invention is concerned with a cellulose dope comprising an aqueous sodium hydroxide solution and cellulose dissolved in the solution, wherein the cellulose dope has a sodium hydroxide concentration ($C_{Na}$) of from 6.5 to 11% by weight, a cellulose content (Cc) of from 5 to 10% by weight, a viscosity average degree of polymerization (DPc) of the cellulose of from 350 to 1,200 and a cellulose dissolution ratio (Sc) of 99.0% by weight or more, and wherein the zero-shear viscosity ($\eta_0$) of the cellulose dope, the cellulose content (Cc) of the cellulose dope, and the viscosity average degree of polymerization of the cellulose in the cellulose dope satisfy a specific relationship. The present invention is also concerned with a method for producing the cellulose dope. The cellulose dope of the present invention is stable and free from gelation even when the cellulose dope has a high content of cellulose having a high degree of polymerization. By the use of the cellulose dope of the present invention, it becomes possible to produce, without using a large amount of a poisonous substance, a regenerated cellulose shaped article (such as a fiber or a film) which has a mechanical strength sufficient for practical use. Therefore, the cellulose dope of the present invention is commercially very advantageous. Further, the present invention is also concerned with a cellulose shaped article obtained by subjecting the cellulose dope to coagulation treatment, and a cellulose slurry used for producing the cellulose dope.

2. Prior Art

Cellulose is a polysaccharide having a linear chain comprising a number of D-glucose (D-glucopyranose) molecules, wherein the mutually adjacent molecules are bonded to each other through β-1,4-bond. Cellulose is a very important substance in industries, which has been used in various fields.

An important example of the usage of cellulose is the use as a material for the so-called regenerated cellulose shaped article. A regenerated cellulose shaped article can be produced by a method which comprises dissolving cellulose in an appropriate solvent to obtain a cellulose solution, and subjecting the obtained cellulose solution to an appropriate chemical treatment, thereby coagulating the cellulose solution. However, cellulose is insoluble in any of water and organic solvents generally used in the art (e.g., alcohols). Therefore, for producing a cellulose solution for use in the production of a regenerated cellulose shaped article (hereinafter, such a solution is frequently referred to as a "cellulose dope"), a special solvent and a special chemical treatment for cellulose are needed.

Most representative examples of regenerated cellulose shaped articles include a fiber and a film. A fiber of regenerated cellulose is called a "rayon", and a film of regenerated cellulose is called a "cellophane". Both of them are very widely used. Further, in some cases, regenerated cellulose shaped articles are used in a particulate form or used in the form of a coating formed on a substrate.

Further, by coagulating a cellulose dope having incorporated therein various edible components, such as a polysaccharide, a polypeptide and a natural resin, an edible shaped article containing the cellulose as a substrate can be obtained (hereinafter, such an edible shaped article is frequently referred to as an "edible cellulose article").

At present, the method for the production of regenerated cellulose shaped articles which is commercially practiced is performed mainly by either of two processes, namely, the viscose process and the cuprammonium process.

The viscose process comprises reacting cellulose with carbon disulfide in the presence of sodium hydroxide to obtain sodium cellulose xanthate, dissolving the sodium cellulose xanthate in an aqueous sodium hydroxide solution to obtain a cellulose dope (viscose), and coagulating the cellulose dope by contacting the cellulose dope with an aqueous acidic solution to thereby obtain a regenerated cellulose shaped article.

On the other hand, the cuprammonium process comprises dissolving cellulose in a cuprammonium solution to thereby obtain a cellulose dope, and contacting the cellulose dope with water and then, with an aqueous acidic solution to coagulate the cellulose dope, thereby obtaining a regenerated cellulose shaped article.

However, both of these two processes need a large amount of a poisonous substance, such as ammonia, carbon disulfide or a heavy metal (copper), in the step for preparing the cellulose dope or for shaping the cellulose dope. Therefore, the environment in the workshop for performing these processes is inevitably polluted.

Moreover, needless to say, these processes necessitate a step for recovering a poisonous substance. If the recovery step is incomplete, a large amount of the poisonous substance is inevitably caused to be discharged in the environment. Therefore, these processes are also disadvantageous from the viewpoint of protection of the environment.

Furthermore, these processes are disadvantageous in that these processes cannot be employed for producing an edible cellulose article.

In order to solve the problems of these processes, various proposals have been made and reported with respect to the environment friendly methods for producing regenerated cellulose shaped articles, which do not use a poisonous substance. As an example of such methods, there can be mentioned a method in which cellulose is dissolved in an aqueous alkali solution, such as an aqueous sodium hydroxide solution, to obtain a cellulose dope, and the obtained cellulose dope is used for producing a regenerated cellulose shaped article.

For easy understanding of the techniques for producing a regenerated cellulose shaped article by using a cellulose dope, abbreviations used for indicating the characteristics of cellulose and a cellulose dope are enumerated below.

DPc: viscosity average degree of polymerization of cellulose.

Cc: cellulose content (% by weight) of a cellulose dope, that is, the ratio of the weight of the cellulose contained in the cellulose dope (i.e., the sum of the weight of the cellulose dissolved in the cellulose dope and the weight of the cellulose remaining undissolved in the cellulose dope) to the weight of the cellulose dope.

$C_{Na}$: sodium hydroxide concentration (% by weight) of a cellulose dope.

Sc: dissolution ratio (% by weight) of cellulose in a cellulose dope, that is, the ratio of the weight of the cellulose dissolved in the cellulose dope to the weight of the cellulose contained in the cellulose dope (i.e., the sum of the weight of the cellulose dissolved in the cellulose dope and the weight of the cellulose remaining undissolved in the cellulose dope).

Rc: amount of undissolved cellulose in a cellulose dope, more specifically, the volume (ml) of the undissolved cellulose contained in 20 liters of the cellulose dope.

An explanation is made below with respect to specific examples of the above-mentioned environment friendly methods. Unexamined Japanese Patent Application Laid-Open Specification Nos. 62-240328 and 62-240329 disclose a method in which cellulose is subjected to steam explosion treatment to render the cellulose soluble in an aqueous alkali solution, the obtained cellulose is dissolved in an alkali solution to thereby obtain a cellulose dope, and the cellulose dope is subjected to wet shaping. The cellulose dope obtained and shaped in this method has a cellulose content (Cc) of only about 5% by weight.

In the above-mentioned method, any of poisonous substances, such as carbon disulfide, a heavy metal and an organic solvent, is not used. However, in the above-mentioned method, the solubilization of the cellulose is unsatisfactory.

In the process for producing a fiber, a film or the like from a cellulose dope, when the cellulose dope used has a Cc value of 5% by weight or more, it is required that the dissolution ratio (Sc) of the cellulose in the dope be 99.0% by weight or more.

When the cellulose dope has a Cc value of 5% by weight and an Sc value of 99.0% by weight, the cellulose dope has an undissolved cellulose amount (Rc) of about 7.9 ml. In the above-mentioned process, a filter is used in order to remove the undissolved cellulose contained in the cellulose dope. When the cellulose dope has a high Rc value, the filter is likely to be clogged. Specifically, when the cellulose dope has an Rc value higher than about 7.9 ml (which is an Rc value obtained when, for example, the cellulose dope has a Cc value of 5% by weight and has an Sc value lower than 99.0% by weight), the filter is frequently clogged, so that a commercial scale production of a fiber, a film or the like becomes practically impossible.

In an actual process for producing a fiber, a film or the like from a cellulose dope, it is required that the Rc value of the cellulose dope be lowered to about 1.6 ml by increasing the Sc value of the cellulose dope to about 99.8% by weight.

In view of this requirement, the cellulose dope obtained by the methods disclosed in the above-mentioned Unexamined Japanese Patent Application Laid-Open Specification Nos. 62-240328 and 62-240329 cannot be used in an actual process for producing a fiber, a film or the like, because the cellulose dopes obtained in these methods have a cellulose dissolution ratio (Sc) of less than 99.0% by weight and, hence, have an undissolved cellulose amount (Rc) as large as 10 ml or more.

As a method which solves the problem accompanying the techniques of the above patent documents, a method is proposed in which, in an attempt to solubilize the cellulose to a satisfactory level (i.e., to increase the Sc value) to thereby lower the Rc value of the cellulose dope, a slurry comprising cellulose dispersed in an aqueous medium is prepared, and a cellulose dope is produced by using the obtained slurry.

For example, Unexamined Japanese Patent Application Laid-Open Specification No. 9-316101 discloses the following two methods.

1) Cellulose is added to a first aqueous alkali solution having a low alkali concentration, wherein the particle size of the cellulose has not been adjusted and the viscosity average degree of polymerization (DPc) of the cellulose has been adjusted to 750 or less. The resultant mixture is stirred to disperse the cellulose in the first aqueous alkali solution, thereby obtaining a slurry. To the obtained slurry is added a second aqueous alkali solution having a high alkali concentration, followed by stirring at a high speed to dissolve the cellulose in the aqueous alkali solution, thereby obtaining a cellulose dope, wherein the second aqueous alkali solution is used such that the final alkali concentration of the cellulose dope becomes 7 to 11% by weight.

2) Cellulose is pulverized in water such that the average particle diameter of the cellulose becomes 20 μm or less, thereby obtaining a slurry. To the obtained slurry is added an aqueous alkali solution having a high alkali concentration, followed by stirring at a high speed to dissolve the cellulose in the aqueous alkali solution, thereby obtaining a cellulose dope, wherein the aqueous alkali solution is used such that the final alkali concentration of the cellulose dope becomes 7 to 11% by weight.

The above-mentioned Unexamined Japanese Patent Application Laid-Open Specification No. 9-316101 describes that, by the above-mentioned two methods, it is possible to produce cellulose dopes having a cellulose content (Cc) of 2% by weight or more and a cellulose dissolution ratio (Sc) of 99% by weight or more.

Specifically, the cellulose dopes obtained in the above-mentioned patent document include cellulose dopes which respectively contain 8% by weight of cellulose having a DPc value of 230, 5% by weight of cellulose having a DPc value of 350 and 2% by weight of cellulose having a DPc value of 750. These cellulose dopes have a cellulose dissolution ratio (Sc) of 99% by weight or more.

However, in the methods of the above patent document, if cellulose having a DPc value higher than that of the cellulose used in the above patent document is used or if a cellulose dope having a Cc value higher than that of the cellulose dope produced in the above patent document is produced (for example, if a cellulose dope containing 10% by weight of the cellulose having a DPc value of 230 is produced), the produced cellulose dope has a problem in that the cellulose is not satisfactorily dissolved in the aqueous alkali solution or in that the cellulose dope is very unstable and susceptible to gelation. Needless to say, such a cellulose dope susceptible to gelation cannot be used in the commercial scale production of a regenerated cellulose shaped article. As seen from the above, in the above-mentioned methods, at least one of the Cc value of the cellulose dope and the DPc value of the cellulose cannot be satisfactorily increased.

Generally, it is considered that the gelation of a cellulose dope occurs due to the association of molecular chains of cellulose, which association of the molecular chains is formed through the hydrogen bonds. (The association of the molecular chains of cellulose is one of the inherent characteristics of cellulose.) Specifically, it is considered that a plurality of molecular chains of the cellulose are associated with each other, wherein unsatisfactorily dissolved portions of the cellulose molecular chains, which portions are not satisfactorily solvated in the aqueous alkali solution, serve as cores of the association, so that the cellulose dope as a whole loses its fluidity, leading to a gelation of the cellulose dope.

By a method generally employed in the art, it is difficult to produce a cellulose shaped article having a strength sufficient for practical use from a cellulose dope containing cellulose having a low DPc value or a cellulose dope having a low Cc value. For obtaining a cellulose shaped article having a strength sufficient for practical use from such a cellulose dope, it is required to coagulate the cellulose dope in a special medium having a very high dehydration ability, such as a concentrated aqueous sulfuric acid solution having a concentration as high as 50 to 80% by weight.

Further, when a cellulose dope containing cellulose having a low DPc value or a cellulose dope having a low Cc value is used for producing a cellulose shaped article, it is very difficult to produce a desired cellulose shaped article (especially, a fiber or a film) by a method generally employed in the art and, hence, it becomes necessary to conduct the production of a cellulose shaped article by a special method. As an example of such special method, there can be mentioned a method in which, in a process for producing a fiber or a film from a cellulose dope, which comprises coagulating a cellulose dope, a net is used in an early stage of the coagulation (see Unexamined Japanese Patent Application Laid-Open Specification No. 7-278941). The reason for the use of a net is as follows. The fiber or film during the course of the coagulation has an unsatisfactory mechanical strength such that it is impossible to reel up the fiber or film by a generally employed process. Therefore, a net is used for reinforcing the fiber or film during the course of the coagulation. However, when a net is used, the operations involved in the production become cumbersome and the production efficiency becomes disadvantageously low.

In addition, as in the case of the production of a fiber or a film, the use of the cellulose dope containing cellulose having a low DPc value or the cellulose dope having a low Cc value in the production of the above-mentioned edible cellulose article is also accompanied by the problem caused by the poor mechanical strength of a cellulose shaped article (i.e., edible cellulose article) during the course of the coagulation. Therefore, the shape of the cellulose shaped article produced is inevitably limited. For example, in the case of the production of an edible cellulose article in the form of a fiber, the diameter of the edible cellulose article needs to be large; and, in the case of the production of an edible cellulose article in the form of a film, the thickness of the edible cellulose article needs to be large. Further, the blending ratio of a polysaccharide, a polypeptide or a natural resin in the edible cellulose article needs to be low. Therefore, the characteristics (such as palatableness) of the edible cellulose article cannot be satisfactorily improved.

With respect to the slurry comprising cellulose dispersed in an aqueous medium, many other examples are known. For example, such a slurry is disclosed in U.S. Pat. No. 5,123,962. However, the slurry described in this patent document is intended to be used as an edible additive, and is not intended to be used in a process in which a cellulose dope is produced from the slurry and the obtained cellulose dope is used for producing a general cellulose shaped article. Further, the cellulose used for producing the slurry has a DPc value of about 200 or less, so that, at least by an ordinary method, it is impossible to produce from the slurry a cellulose shaped article having a strength sufficient for practical use.

Descriptions on slurries used for producing a cellulose dope are also found in patent documents other than the above-mentioned Unexamined Japanese Patent Application Laid-Open Specification Nos. 62-240328, 62-240329 and 9-316101. For example, Unexamined Japanese Patent Application Laid-Open Specification No. 9-124702 discloses a technique for rendering cellulose soluble in an aqueous alkali solution by microfibrillating cellulose. In the technique of this patent document, cellulose is subjected to wet pulverization treatment using a stone mill type wet pulverizer to obtain a slurry comprising a microfibrillated cellulose dispersed in an aqueous medium, in which the number of microfibrils having a fiber diameter of 1 μm or less amounts to 95% or more, based on the total number of microfibrils (in a preferred mode, the number of microfibrils having a fiber diameter of 500 nm or less amounts to 90% or more, based on the total number of microfibrils).

This patent document also describes that, when a cellulose dope having a cellulose content (Cc) of 5.4% by weight is produced by using a slurry obtained by subjecting cellulose having a DPc value of about 700 to the above-mentioned treatment, and an aqueous sodium hydroxide solution having a sodium hydroxide concentration of 9.2% by weight, the produced cellulose dope has a cellulose dissolution ratio (Sc) of about 95%.

Further, the above patent document also describes that, when a cellulose dope having a cellulose content (Cc) of 7% by weight is produced by using a slurry obtained by subjecting to the above-mentioned treatment cellulose having a DPc value of about 300 (crystal type: cellulose II) which is produced from an alkali cellulose for use in the production of a rayon, and an aqueous sodium hydroxide solution having a sodium hydroxide concentration of 8.5% by weight, the produced cellulose dope has a cellulose dissolution ratio (Sc) of about 90%.

However, as mentioned above, in the process for producing a fiber, a film or the like from a cellulose dope, when the cellulose dope used has a Cc value of 5% by weight or more and has an Sc value of less than 99.0% by weight, it is practically impossible to produce a fiber, a film or the like on a commercial scale. Therefore, the cellulose dope cannot be used in an actual process for producing a fiber, a film or the like unless an operation for removing a substantial amount of the undissolved cellulose from the cellulose dope is conducted.

Further, as mentioned above, in the technique of Unexamined Japanese Patent Application Laid-Open Specification No. 9-124702, cellulose is microfibrillated by using a stone mill type wet pulverizer in order to produce a slurry containing a microfibrillated cellulose. However, the produced slurry has an extremely high viscosity, so that, in the production of a cellulose dope by the use of the slurry, the slurry needs to be stirred under a very high shearing stress. As described below, the extremely high viscosity of the slurry is considered to be caused by a network of microfibrils formed by the interaction between microfibrils of the cellulose. Further, as the degree of polymerization of the cellulose increases, the yield shearing stress of the slurry increases, so that a high shearing stress is needed for stirring the slurry. Therefore, it is very difficult to produce a cellulose dope by using the above-mentioned slurry.

In general, as a pretreatment conducted prior to the production process of the above-mentioned viscose (i.e., cellulose dope obtained by dissolving sodium cellulose xanthate in an aqueous sodium hydroxide solution), the cellulose is pulverized in an aqueous alkali solution. As the aqueous alkali solution, an aqueous alkali solution having an alkali concentration as high as 10% by weight is generally used. It is considered that the aqueous alkali solution having such a high alkali concentration is used for the purpose of improving the pulverization efficiency. However, when cellulose is contacted with an aqueous alkali solution having such a high alkali concentration, the cellulose is converted into a crystalline alkali cellulose. Since a crystalline alkali cellulose is completely insoluble in an aqueous alkali solution, the slurry obtained by the above-mentioned method cannot be used for producing a cellulose dope containing an aqueous alkali solution as a solvent.

Unexamined Japanese Patent Application Laid-Open Specification No. 4-348130 discloses a method for producing particulate cellulose by aging cellulose in the presence of an alkali.

However, the cellulose used has a viscosity average degree of polymerization (DPc) of from 20 to 150. As already explained above, it is extremely difficult to produce a cellulose shaped article for practical use by the use of cellulose having such a low degree of polymerization. Moreover, it should be noted that the above-mentioned aging in itself is a technique for converting cellulose into a crystalline alkali cellulose which is completely insoluble in an aqueous alkali solution. Therefore, the technique of the above patent document cannot be used for the production of a cellulose dope containing an aqueous alkali solution as a solvent.

From the above, it is apparent that a conventional cellulose dope containing an aqueous alkali solution as a solvent for cellulose, which is produced by the conventional method, has various problems caused by the unsatisfactory solubilization of the cellulose. The problems can be enumerated as follows:

the cellulose dope contains a large amount of undissolved cellulose, so that the cellulose dope cannot be used in an actual production process;

the amount of cellulose having a satisfactory degree of polymerization, which is dissolved in the cellulose dope, is not sufficient for producing a cellulose shaped article having a sufficient strength for practical use; and the cellulose dope is unstable and susceptible to gelation.

Thus, the conventional cellulose dope has a problem in that there are fatal defects with respect to the mechanical properties of the cellulose shaped article produced from the conventional cellulose dope and the procedure necessary for producing the cellulose shaped article from the conventional cellulose dope.

SUMMARY OF THE INVENTION

In this situation, the present inventors have made extensive and intensive studies with a view toward developing a cellulose dope which is stable and free from gelation even when it has a high content of cellulose having a high degree of polymerization and which can be used for producing, without using a large amount of a poisonous substance, a regenerated cellulose shaped article (such as a fiber or a film) having a mechanical strength sufficient for practical use. As a result, it has unexpectedly been found that, when a cellulose dope comprising an aqueous sodium hydroxide solution and cellulose dissolved in the solution exhibits a zero-shear viscosity ($\eta_0$) which satisfies a specific relationship between the cellulose content (Cc) of the cellulose dope and the viscosity average degree of polymerization (DPc) of the cellulose in the cellulose dope, the cellulose dope is stable and free from gelation even when it has a high content of cellulose having a high degree of polymerization.

It has also been found that the cellulose dope can be produced by using a cellulose slurry having unique physical properties, which slurry has been produced by a specific method.

Based on these findings, the present invention has been completed.

Accordingly, it is a primary object of the present invention to provide a cellulose dope which is stable and free from gelation even when it has a high content of cellulose having a high degree of polymerization.

It is another object of the present invention to provide a method for producing the cellulose dope.

It is still another object of the present invention to provide a cellulose shaped article obtained by subjecting the cellulose dope to coagulation treatment.

It is still another object of the present invention to provide a cellulose slurry used for producing the cellulose dope.

The foregoing and other objects, features and advantages of the present invention will be apparent from the following detailed description and appended claims taken in connection with the accompanying drawings.

DETAILED DESCRIPTION OF THE INVENTION

Figure 1:
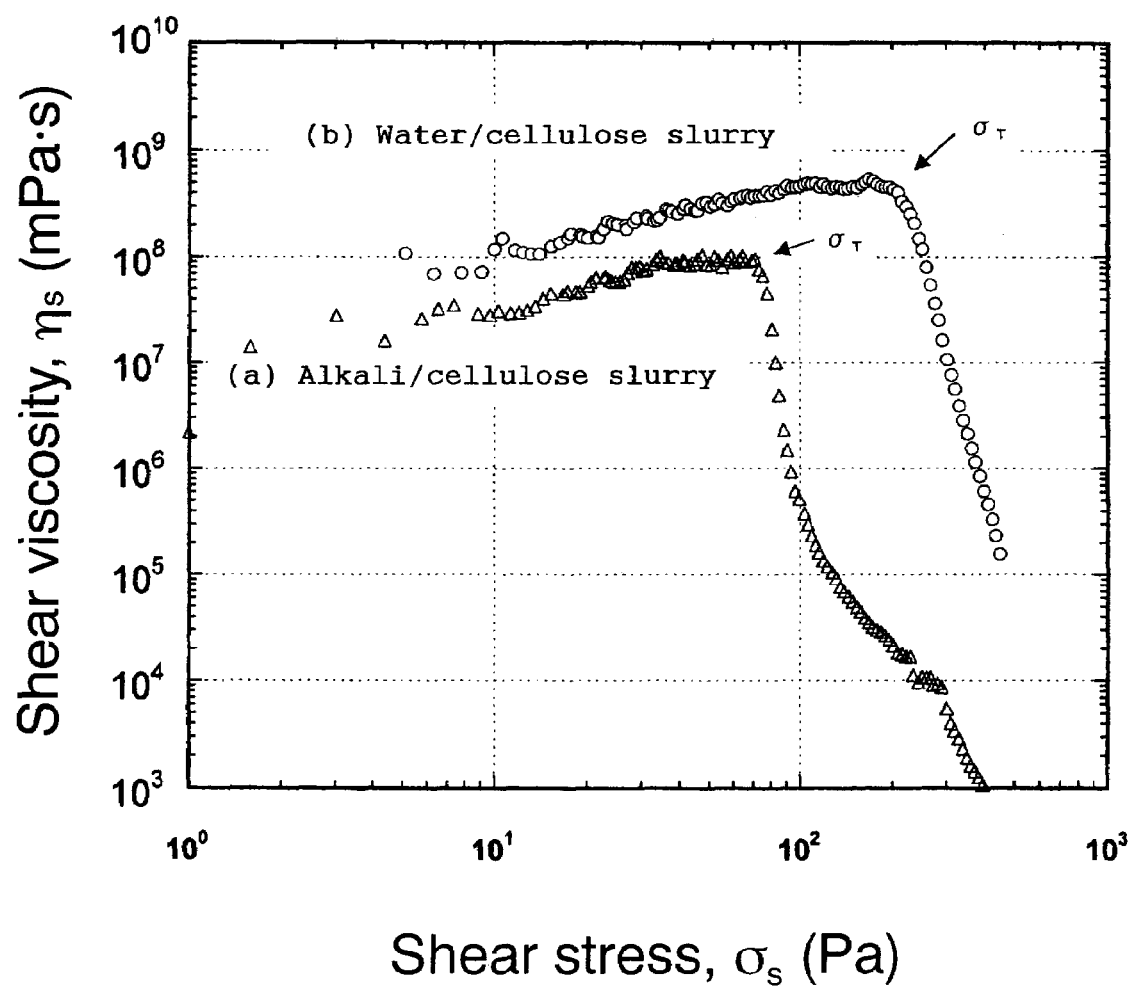
FIG. 1 is a viscosity-stress curve showing the viscosity characteristics of the cellulose slurry of the present invention.

According to the present invention, there is provided a cellulose dope comprising an aqueous sodium hydroxide solution and cellulose dissolved in the solution, the cellulose dope having a sodium hydroxide concentration ($C_{Na}$) of from 6.5 to 11% by weight, a cellulose content (Cc) of from 5 to 10% by weight, a viscosity average degree of polymerization (DPc) of the cellulose of from 350 to 1,200 and a cellulose dissolution ratio (Sc) of 99.0% by weight or more, wherein the cellulose dope exhibits a zero-shear viscosity ($\eta_0$) which satisfies the following formula (1):

$$\eta_0 = kCc^m \times DPc^p \quad (1)$$

wherein:

$\eta_0$ represents the zero-shear viscosity (mPa·s) of the cellulose dope,

Cc represents the cellulose content (% by weight) of the cellulose dope,

DPc represents the viscosity average degree of polymerization of the cellulose in the cellulose dope, $k = 3.9 \times 10^{-11}$, m is a number of from 5 to 7, and p is a number of from 3 to 4.

For easy understanding of the present invention, the essential features and various preferred embodiments of the present invention are enumerated below.

1. A cellulose dope comprising an aqueous sodium hydroxide solution and cellulose dissolved in the solution, the cellulose dope having a sodium hydroxide concentration ($C_{Na}$) of from 6.5 to 11% by weight, a cellulose content (Cc) of from 5 to 10% by weight, a viscosity average degree of polymerization (DPc) of the cellulose of from 350 to 1,200 and a cellulose dissolution ratio (Sc) of 99.0% by weight or more, wherein the cellulose dope exhibits a zero-shear viscosity ($\eta_0$) which satisfies the following formula (1):

$$\eta_0 = kCc^m \times DPc^p \quad (1)$$

wherein:
$\eta_0$ represents the zero-shear viscosity (mPa·s) of the cellulose dope,
Cc represents the cellulose content (% by weight) of the cellulose dope,
DPc represents the viscosity average degree of polymerization of the cellulose in the cellulose dope,
$k = 3.9 \times 10^{-11}$,
m is a number of from 6.3 to 6.5, and
p is a number of from 3.2 to 3.5,
the cellulose dope being produced by a method which comprises:

(1) providing a cellulose slurry comprising an aqueous sodium hydroxide solution and, dispersed therein, particulate cellulose having an average particle diameter of 30 μm or less, the cellulose slurry having a sodium hydroxide concentration of from 0.5 to less than 6.5% by weight and a cellulose content of 5% by weight or more, (2) adjusting the sodium hydroxide concentration of the cellulose slurry to 6.5 to 11% by weight, and (3) stirring the cellulose slurry at 10° C. or less by means of a stirrer under stirring conditions satisfying at least one requirement selected from the group consisting of the requirement that the stirring is performed at a shear rate of 9,000/sec or less and the requirement that the stirring is performed at a stirring speed of 500 m/min or less in terms of the speed at which the outer end of an agitating element of the stirrer is rotated, the steps (2) and (3) being conducted in the order of step (2) and step (3) or simultaneously, thereby causing the particulate cellulose to be dissolved in the cellulose slurry to the extent that the cellulose has a dissolution ratio (Sc) of 99.0% by weight or more, to obtain a cellulose dope, wherein the cellulose slurry satisfies the following formula (2):

$$\sigma_T = K_1 \exp(k_1 C_{Na}) \quad (2)$$

wherein:
$\sigma_T$ represents the yield stress (Pa) of the slurry,
$K_1$ represents an arbitrary constant (Pa),
$k_1$ is 0 or less, and
$C_{Na}$ is the sodium hydroxide concentration (% by weight) of the slurry, and wherein, in the solid state NMR analysis of the slurry, the cellulose in the slurry exhibits a non-crystallinity ($\chi$am) of 0.5 or more, the non-crystallinity being defined by the following formula (3):

$$\chi am = I_{high}/(I_{high} + I_{low}) \quad (3)$$

wherein:
$\chi$am is the non-crystallinity of the cellulose in the slurry, and
$I_{high}$ and $I_{low}$ respectively represent the ratios of the areas of the peaks in a solid state NMR spectrum of the slurry, wherein the peaks are, respectively, ascribed to the higher magnetic field component and lower magnetic field component of the 4-position carbon atoms of the glucose units of the cellulose in the slurry, and wherein separation between the peaks respectively ascribed to the higher magnetic field component and the lower magnetic field component is made using a method in which each of the peaks is approximated to the Gaussian distribution function.

2. The cellulose dope according to item 1 above, wherein, in the NMR analysis of the cellulose dope, the 6-position carbon atoms of the glucose units of the cellulose exhibit a longitudinal relaxation time ($\tau$c) of from 10 to 400 ms, and the 1-position carbon atoms of the glucose units of the cellulose exhibit a longitudinal relaxation time ($\tau$c) of from 200 to 10,000 ms.

3. The cellulose dope according to item 2 above, wherein, in the NMR analysis of the cellulose dope, the 6-position carbon atoms of the glucose units of the cellulose exhibit a longitudinal relaxation time ($\tau$c) of from 10 to 200 ms.

4. The cellulose dope according to item 1 above, wherein the hydroxyl groups of the cellulose are partially modified by reaction with a reagent which is reactive with a hydroxyl group in the presence of an alkali, wherein the reagent is selected from the group consisting of a vinyl compound, an etherification agent and a xanthation agent.

5. The cellulose dope according to item 4 above, wherein the reagent is used in an amount of 0.1 mole or less per mole of glucose units in the cellulose.

6. A cellulose slurry comprising an aqueous sodium hydroxide solution and, dispersed therein, particulate cellulose having an average particle diameter of 30 μm or less, the cellulose slurry having a sodium hydroxide concentration of from 0.5 to less than 6.5% by weight and a cellulose content of 5% by weight or more, wherein the cellulose slurry satisfies the following formula (2):

$$\sigma_T = K_1 \exp(k_1 C_{Na}) \quad (2)$$

wherein:
$\sigma_T$ represents the yield stress (Pa) of the slurry,
$K_1$ represents an arbitrary constant (Pa),
$k_1$ is 0 or less, and
$C_{Na}$ is the sodium hydroxide concentration (% by weight) of the slurry, and wherein, in the solid state NMR analysis of the slurry, the cellulose in the slurry exhibits a non-crystallinity ($\chi$am) of 0.5 or more, the non-crystallinity being defined by the following formula (3):

$$\chi am = I_{high}/(I_{high} + I_{low}) \quad (3)$$

wherein:
$\chi$am is the non-crystallinity of the cellulose in the slurry, and
$I_{high}$ and $I_{low}$ respectively represent the ratios of the areas of the peaks in a solid state NMR spectrum of the slurry, wherein the peaks are, respectively, ascribed to the higher magnetic field component and lower magnetic field component of the 4-position carbon atoms of the glucose units of the cellulose in the slurry, and wherein separation between the peaks respectively ascribed to the higher magnetic field component and the lower magnetic field component is made using a method in which each of the peaks is approximated to the Gaussian distribution function.

7. The cellulose slurry according to item 6 above, which satisfies the following formula (4):

$$\sigma_T = K_2 + k_2 DPc \quad (4)$$

wherein:
σ_T represents the yield stress (Pa) of the slurry,
K_2 represents an arbitrary constant (Pa),
k_2 is 0 or less (Pa), and
DPc represents the viscosity average degree of polymerization of the cellulose in the slurry.

8. The cellulose slurry according to item 6 or 7 above, wherein the cellulose has an average particle diameter of 20 μm or less.

9. The cellulose dope according to item 1 above, wherein the cellulose slurry satisfies the following formula (4):

$$\sigma_T = K_2 + k_2 DPc \quad (4)$$

wherein:
σ_T represents the yield stress (Pa) of the slurry,
K_2 represents an arbitrary constant (Pa),
k_2 is 0 or less (Pa), and
DPc represents the viscosity average degree of polymerization of the cellulose in the slurry.

10. The cellulose dope according to item 1 above, wherein the cellulose in the cellulose slurry has an average particle diameter of 20 μm or less.

11. The cellulose dope according to item 1 above, wherein the method further comprises, at a point in time which is after step (1) and before the end of step (3), adding to the cellulose slurry a reagent which is reactive with a hydroxyl group in the presence of an alkali, wherein the reagent is selected from the group consisting of a vinyl compound, an etherification agent and a xanthation agent.

12. The cellulose dope according to item 11 above, wherein the reagent is used such that the amount of the reagent is 0.1 mole or less per mole of glucose units in the cellulose in the cellulose slurry.

13. The method according to any one of items 8 to 11 above, which further comprises, at a point in time which is after step (1) and before the end of step (3), adding to the cellulose slurry a reagent which is reactive with a hydroxyl group in the presence of an alkali.

14. The method according to item 12 or 13 above, wherein the reagent is selected from the group consisting of an etherification agent and a xanthation agent.

15. The method according to any one of items 12 to 14 above, wherein the reagent is used such that the amount of the reagent is 0.1 mole or less per mole of glucose units in the cellulose in the cellulose dope.

13. A cellulose shaped article obtained by subjecting the cellulose dope of any one of items 1 to 5 and 9 to 12 above to at least one coagulation treatment selected from the group consisting of drying coagulation, gelation coagulation and neutralization coagulation.

14. The cellulose shaped article according to item 13 above, wherein the cellulose dope contains at least one additive selected from the group consisting of a polysaccharide, a polypeptide and a natural resin.

15. The cellulose shaped article according to item 13 or 14 above, which is a fibrous body, a flat film, a tubular film, a hollow fiber, a particle, a sponge body or a coating.

Hereinbelow, the present invention is described in detail.

The cellulose dope of the present invention comprises an aqueous sodium hydroxide solution and cellulose dissolved in the solution, wherein the cellulose dope has a sodium hydroxide concentration ($C_{Na}$) of from 6.5 to 11% by weight and a cellulose content (Cc) of from 4 to 12,% by weight, and wherein the cellulose dope exhibits a zero-shear viscosity ($\eta_0$) which satisfies the following formula (1):

$$\eta_0 = kCc^m \times DPc^p \quad (1)$$

wherein:
$\eta_0$ represents the zero-shear viscosity (mPa·s) of the cellulose dope,
Cc represents the cellulose content (% by weight) of the cellulose dope,
DPc represents the viscosity average degree of polymerization of the cellulose in the cellulose dope,
$k = 3.9 \times 10^{-11}$,
m is a number of from 5 to 7, and
p is a number of from 3 to 4.

When the cellulose dope has a cellulose content (Cc) of less than 4% by weight, the cellulose contained in the cellulose dope is easily solubilized, so that the stability of the cellulose dope is improved and the gelation can be effectively prevented; however, a cellulose shaped article (such as a fiber or a film) produced by using the cellulose dope has a disadvantageously low mechanical strength. Further, in this case, the strength of the cellulose shaped article during the production thereof is, of course, also low and, hence, it is difficult to produce stably a cellulose shaped article on a commercial scale. In addition, when the sodium hydroxide concentration ($C_{Na}$) of the cellulose dope is outside of the range of from 6.5 to 11% by weight, the cellulose contained in the cellulose dope cannot be satisfactorily dissolved in the aqueous sodium hydroxide solution.

It is generally practiced to obtain the viscosity of a polymer solution as a product of a power function of the polymer concentration of the solution, multiplied by a power function of the molecular weight of the polymer. This means that when the natural logarithmic values of the viscosities are plotted against the natural logarithmic values of the polymer concentrations or polymer molecular weights, a straight line is obtained. However, the relationship represented by such a straight line is satisfied only when the polymer concentration or polymer molecular weight is within the specific range. In other words, when the polymer concentration or polymer molecular weight is not in the specific range, the relationship is no longer satisfied. Specifically, for example, when the polymer concentration or polymer molecular weight exceeds the specific range, the amount of change in the natural logarithmic value of the viscosity becomes markedly large, relative to the amount of change in the natural logarithmic value of the polymer concentration or polymer molecular weight. This is because the above-mentioned relationship is satisfied only when the polymer solution is in a state wherein the whole polymer is satisfactorily solvated and neither association nor crosslinking occurs in the solution.

The above-mentioned relationship also applies to a cellulose solution (cellulose dope). Specifically, a cellulose dope exhibits a zero-shear viscosity ($\eta_0$) which satisfies the relationship of formula (1) above, that is, the zero-shear viscosity ($\eta_0$) of the cellulose dope is a product of the power function of the cellulose content (Cc) of the cellulose dope, multiplied by the power function of the viscosity average degree of polymerization (DPc) of the cellulose in the cellulose dope. In the case of the cellulose dope of the present invention, the ranges of the cellulose content (Cc) and the viscosity average degree of polymerization (DPc) which satisfy formula (1) above are broad, as compared to those in the case of the conventional cellulose dope.

The determination as to whether or not a cellulose dope exhibits a zero-shear viscosity ($\eta_0$) which satisfies formula (1) above can be easily conducted by the following method.

First, the weight of the cellulose dope and the zero-shear viscosity ($\eta_0$) of the cellulose dope are measured. The value of the zero-shear viscosity ($\eta_0$) obtained by the measurement is hereinafter referred to as the "found zero-shear viscosity".

Next, the cellulose in the cellulose dope is precipitated by an appropriate method, such as a method in which the cellulose dope is neutralized by adding an acid to the cellulose dope to thereby precipitate the cellulose contained in the cellulose dope. The precipitated cellulose is recovered and, after the precipitated cellulose is recovered and dried, the weight of the cellulose is measured. The ratio (% by weight) of the weight of the recovered, dried cellulose to the weight of the cellulose dope is defined as the cellulose content (Cc) of the cellulose dope.

Further, the viscosity average degree of polymerization (DPc) of the recovered, dried cellulose is measured.

Then, the obtained cellulose content (Cc) and the obtained viscosity average degree of polymerization (DPc) are substituted in formula (1) above, and the zero-shear viscosity ($\eta_0$) is calculated with respect to each of the following four cases:

the case where m=5 and p=3;
the case where m=7 and p=3;
the case where m=5 and p=4; and
the case where m=7 and p=4.

When the found zero-shear viscosity mentioned above is within the range of from the minimum of the calculated four values of the zero-shear viscosity to the maximum of the four values, this means that the cellulose dope exhibits a zero-shear viscosity ($\eta_0$) which satisfies formula (1) above.

In the cellulose dope of the present invention, it is preferred that the viscosity average degree of polymerization (DPc) of the cellulose is from 350 to 1,200 and that the cellulose content (Cc) is from 5 to 10% by weight. Further, it is preferred that m and p in formula (1) above are, respectively, from 6.3 to 6.5 and from 3.2 to 3.5. The narrowness of the ranges of m and p in formula (1) above means that the cellulose in the cellulose dope of the present invention is highly solubilized.

Conventionally, it was very difficult to produce a cellulose dope having a high content of cellulose having a high degree of polymerization. Further, it was conventionally considered that the higher the cellulose content and the polymerization degree of the cellulose, the more unstable and susceptible to gelation the cellulose dope becomes. However, surprisingly, the cellulose dope of the present invention is stable and free from gelation even when it has a high content of cellulose having a high polymerization degree.

Hereinbelow, for illustratively showing the essential features of the present invention, the technical features of the present invention are explained by reviewing how the present invention has been completed. In the explanation made below, the six carbon atoms of the glucose unit of cellulose are abbreviated as follows:

1-position carbon atom of the glucose unit: C1
2-position carbon atom of the glucose unit: C2
3-position carbon atom of the glucose unit: C3
4-position carbon atom of the glucose unit: C4
5-position carbon atom of the glucose unit: C5
6-position carbon atom of the glucose unit: C6

As mentioned above, cellulose is a polysaccharide having a linear chain comprising a number of D-glucose (D-glucopyranose) units, wherein the mutually adjacent units are bonded to each other through β-1,4-bond. Therefore, a cellulose molecule contains a number of hydroxyl groups which are hydrophilic groups and, hence, it is expected that cellulose is highly hydrophilic. However, actually, cellulose is completely insoluble in water. The reason for this is considered as follows.

In general, when a compound is in a solid state, the distance between mutually adjacent molecules of the compound is small. Therefore, the conformation of the molecules is fixed by the interactions between the molecules, such as intermolecular hydrogen bonds.

However, when the compound is dissolved in a solvent, each of the molecules of the compound is surrounded by the molecules of the solvent, so that the above-mentioned interactions between the molecules of the compound are eliminated. As a result, the degree of freedom of the conformation of the molecules of the compound is greatly increased. This means that, when a compound in a solid state is dissolved in a solvent to obtain a solution, the entropy of the system comprising the compound and the solvent becomes high, as compared to the entropy of the compound in a solid state.

In other words, when the entropy of the system comprising the compound and the solvent, which is obtained by contacting a compound in a solid state with a solvent, becomes not higher than the entropy of the compound in a solid state, it follows that the compound is insoluble in the solvent. In general, the reason for the insolubility of a compound in a solvent is that the affinity between the compound and the solvent is not so high as to eliminate the above-mentioned interactions between the molecules of the compound.

However, in the case of cellulose, as mentioned above, cellulose is completely insoluble in water despite that a cellulose molecule contains many hydroxyl groups which are hydrophilic groups and, hence, it is expected that cellulose is highly hydrophilic. The reason for this is considered as follows.

In cellulose, an intramolecular hydrogen bond is present between two mutually adjacent glucose units of cellulose (i.e., two glucose units of cellulose which are bonded to each other through β-1,4-bond). Specifically, the intramolecular hydrogen bond is present between the hydroxyl group bonded to C3 of one of the above two glucose units and the oxygen atom (which is a ring-forming atom of the 6-membered ring of the glucose unit) bonded to C5 of another one of the above two glucose units. As a result, the positional relationship between the two adjacent glucose units is substantially fixed.

Such intramolecular hydrogen bonds are present in nearly throughout the cellulose molecular chain, so that substantially the whole of the cellulose molecule becomes a rigid, linear molecular chain having a very low degree of freedom of conformation.

In general, the intermolecular hydrogen bonds are easily broken by water. Also in the case of cellulose, hydrogen bonds between molecules of cellulose are easily broken by water, so that the cellulose is swelled with water. On the other hand, in general, the intramolecular hydrogen bonds are not broken by water. Also in the case of cellulose, when cellulose is contacted with water, the intramolecular hydrogen bonds in the cellulose are not broken and, hence, the cellulose molecule continues to be in the form of a rigid, linear molecular chain, which means that the degree of freedom of the conformation of the cellulose molecule remains low. Therefore, when cellulose in a solid state is contacted with water, the entropy of the system comprising the cellulose and the water is not higher than that of the cellulose in a solid state. Accordingly, the cellulose is swelled with water but is insoluble in water.

As can be seen from the above, for dissolving cellulose in a solvent to obtain a cellulose dope, it is necessary to increase the degree of freedom of the conformation of the molecule of the cellulose by breaking the above-mentioned intramolecular hydrogen bonds in the cellulose.

It should be noted that, when the degree of breakdown of the intramolecular hydrogen bonds in the cellulose is unsatisfactory, cellulose (in the solution) having a high degree of freedom of the conformation immediately reverts to insoluble cellulose having a low degree of freedom of the conformation, so that the cellulose dope becomes unstable and susceptible to gelation. Therefore, for producing a cellulose dope which is stable and free from gelation, it is necessary to break the intramolecular hydrogen bonds in the cellulose as much as possible, and it is preferred to break all of the intramolecular hydrogen bonds in the cellulose.

It should also be noted that the higher the degree of breakdown of the intramolecular hydrogen bonds in the cellulose, the lower the viscosity of the produced cellulose dope becomes. Therefore, also from a viewpoint of producing a cellulose dope having a high processability, it is necessary to break the intramolecular hydrogen bonds in the cellulose as much as possible, and it is preferred to break all of the intramolecular hydrogen bonds in the cellulose.

As a representative example of methods for breaking the intramolecular hydrogen bonds in the cellulose, there can be mentioned a chemical modification method in which the cellulose is subjected to chemical modification to thereby prevent the formation of intramolecular hydrogen bonds in the cellulose. Since, as mentioned above, the hydroxyl group bonded to C3 is directly involved in the formation of the intramolecular hydrogen bonds in the cellulose, the formation of intramolecular hydrogen bonds in the cellulose can be prevented by modifying the above-mentioned hydroxyl group. Further, by modifying the hydroxyl group bonded to C2, the formation of the intramolecular hydrogen bonds in the cellulose can be indirectly prevented.

As specific examples of this chemical modification method, there can be mentioned the above-mentioned viscose process and the above-mentioned cuprammonium process, both of which are the methods for producing regenerated cellulose shaped articles which are commercially important.

In the case of the cuprammonium process, cellulose is bonded to the copper in a cuprammonium solution to form a complex. In this case, both of the hydroxyl group bonded to C3 and the hydroxyl group bonded to C2 are involved in the formation of the complex, so that the intramolecular hydrogen bonds in the cellulose are broken.

It is considered that, in a cellulose dope which is actually used in the cuprammonium process, substantially all of the intramolecular hydrogen bonds in the cellulose are broken, so that the stability and processability of the cellulose dope are very high. Specifically, it is considered that, when kept in a closed vessel, the cellulose dope remains stable for several years. The cellulose dope also has a low viscosity and a very high fluidity, so that the cellulose dope has a very high stringiness.

On the other hand, in the viscose process, which is more frequently employed on a commercial scale than the cuprammonium process, the intramolecular hydrogen bonds in the cellulose are broken by reacting the hydroxyl group in the cellulose with carbon disulfide to form a xanthogenic acid ester.

However, in a cellulose dope (viscose) which is actually used in the viscose process, only 30% by weight or less of the sum of the hydroxyl groups bonded to C3 atoms in the cellulose and the hydroxyl groups bonded to C2 atoms in the cellulose are esterified to form a xanthogenic acid ester. Therefore, a substantial amount of the intramolecular hydrogen bonds remain in the cellulose molecules dissolved in the cellulose dope and, hence, the stability and processability of the cellulose dope are low. Specifically, the cellulose dope is gelled within a few days after the production thereof.

Taking into consideration the above-mentioned conventional knowledge about the solubilization of cellulose, the present inventors have made extensive and intensive studies with a view toward developing a cellulose dope which not only has a high content of cellulose having a high degree of polymerization, but also is stable and free from gelation. As a result, it has been found that, when a cellulose dope comprising an aqueous sodium hydroxide solution and cellulose dissolved in the solution exhibits a zero-shear viscosity ($\eta_0$) which satisfies the above-mentioned formula (1), the cellulose dope is stable and free from gelation even if the cellulose dope has a high content of cellulose having a high degree of polymerization.

In the present invention, it is preferred that, in the NMR analysis of the cellulose dope, the 6-position carbon atoms (C6) of the glucose units of the cellulose exhibit a longitudinal relaxation time ($\tau c$) of from 10 to 400 ms, more advantageously from 10 to 200 ms. It is also preferred that, in the NMR analysis of the cellulose dope, the 1-position carbon atoms (C1) of the glucose units of the cellulose exhibit a longitudinal relaxation time ($\tau c$) of from 200 to 10,000 ms.

The longitudinal relaxation time ($\tau c$) of a carbon atom in the cellulose dope is an index of the degree of the vigorousness of the movement of the carbon atom. More specifically, a carbon atom which moves vigorously has a large $\tau c$ value; and a carbon atom which moves slightly or exhibits substantially no movement has a small $\tau c$ value.

It is possible that the movement of a carbon atom in the cellulose dope is impeded by various factors, such as the intramolecular and/or intermolecular hydrogen bonds in the cellulose. In this case, the longitudinal relaxation time ($\tau c$) of the carbon atom becomes short. Therefore, the higher the degree of breakdown of the intramolecular and/or intermolecular hydrogen bonds and the higher the degree of freedom of the conformation of the cellulose molecule (in other words, the higher the solubility of the cellulose and the more stable and susceptible to gelation the cellulose dope), the larger the $\tau c$ values of the carbon atoms of the glucose units of the cellulose become.

When the degree of breakdown of the above-mentioned intramolecular hydrogen bonds in the cellulose is high and the cellulose molecule has a high degree of freedom of the conformation, the entire cellulose molecule becomes highly flexible and able to move relatively freely as in the case of a general linear polymer. Therefore, when the degree of breakdown of the above-mentioned intramolecular hydrogen bonds in the cellulose is high and the cellulose molecule has a high degree of freedom of the conformation, C1 present in the main chain of the cellulose has a large $\tau c$ value.

By contrast, the higher the solubilization of the cellulose, the smaller the $\tau c$ value of C6 becomes. The reason for this is considered as follows.

With respect to the position of C6 in the structure of cellulose, C6 is present in a side chain bonded to a molecular chain comprising C1 to C5 and oxygen atoms. Therefore, even if cellulose as a whole has a relatively low degree of freedom of the conformation, the degree of freedom of the conformation of C6 is relatively high. On the other hand, when cellulose is highly solubilized, C6 is surrounded by a large number of the molecules of a solvent (water) due to the solvation, so that the movement of C6 is impeded (that is, the degree of freedom of the conformation of C6 becomes low). As a result, the τc value of the C6 becomes small.

With respect to the gelation of a cellulose dope, this phenomenon can be understood as a phase separation (precipitation of cellulose) occurring at a microscopic level. The above phase separation means the separation (by precipitation) of cellulose from the system comprising the independent microphases of cellulose which are separated from each other through water and the like. When the gelation occurs, the molecules of water surrounding the cellulose are separated from the cellulose, so that the above-mentioned intramolecular and intermolecular hydrogen bonds in the cellulose are re-formed. As a result, the degree of freedom of the conformation of cellulose as a whole is lowered. However, in the case of C6, the movement of C6 is no longer impeded by the molecules of water surrounding the cellulose, so that the degree of freedom of the conformation of C6 becomes high.

As can be seen from the above, the cellulose dope of the present invention has a characteristic that the higher the solubilization of the cellulose in the cellulose dope, the more vigorous the movement of C1 becomes and the less vigorous the movement of C6 becomes.

The cellulose dope of the present invention can be produced by a method comprising the following steps (1) to (3):

(1) providing a cellulose slurry comprising an aqueous sodium hydroxide solution and, dispersed therein, particulate cellulose having an average particle diameter of 30 μm or less, the cellulose slurry having a sodium hydroxide concentration of from 0.5 to less than 6.5% by weight and a cellulose content of 5% by weight or more, (2) adjusting the sodium hydroxide concentration of the cellulose slurry to 6.5 to 11% by weight, and (3) stirring the cellulose slurry at 10° C. or less by means of a stirrer under stirring conditions satisfying at least one requirement selected from the group consisting of the requirement that the stirring is performed at a shear rate of 9,000/sec or less and the requirement that the stirring is performed at a stirring speed of 500 m/min or less in terms of the speed at which the outer end of an agitating element of the stirrer is rotated, the steps (2) and (3) being conducted in the order of step (2) and step (3) or simultaneously, thereby causing the particulate cellulose to be dissolved in the cellulose slurry to the extent that the cellulose has a dissolution ratio of 99.0% by weight or more, to obtain a cellulose dope, wherein the cellulose slurry satisfies the following formula (2):

$$\sigma_T = K_1 \exp(k_1 C_{Na}) \quad (2)$$

wherein:

$\sigma_T$ represents the yield stress (Pa) of the slurry, $K_1$ represents an arbitrary constant (Pa), $k_1$ is 0 or less, and $C_{Na}$ is the sodium hydroxide concentration (% by weight) of the slurry, and wherein, in the solid state NMR analysis of the slurry, the cellulose in the slurry exhibits a non-crystallinity ($\chi$am) of 0.5 or more, the non-crystallinity being defined by the following formula (3):

$$\chi am = I_{high}/(I_{high} + I_{low}) \quad (3)$$

wherein:

$\chi$am is the non-crystallinity of the cellulose in the slurry, and $I_{high}$ and $I_{low}$ respectively represent the ratios of the areas of the peaks in a solid state NMR spectrum of the slurry, wherein the peaks are, respectively, ascribed to the higher magnetic field component and lower magnetic field component of the 4-position carbon atoms of the glucose units of the cellulose in the slurry, and wherein separation between the peaks respectively ascribed to the higher magnetic field component and the lower magnetic field component is made using a method in which each of the peaks is approximated to the Gaussian distribution function.

First, an explanation is made with respect to the above-mentioned step (1).

In the step (1) is provided a cellulose slurry which comprises an aqueous sodium hydroxide solution and, dispersed therein, particulate cellulose having an average particle diameter of 30 μm or less and which has a sodium hydroxide concentration of from 0.5 to less than 6.5% by weight and a cellulose content of 5% by weight or more.

Examples of celluloses used for preparing the cellulose slurry include natural cellulose, such as pulp, cotton and cotton linter; and regenerated cellulose obtained from a cellulose solution, such as viscose or a cuprammonium solution of cellulose. These celluloses can be used individually or in combination.

When it is intended to use the slurry of natural cellulose for producing a cellulose dope containing highly solubilized cellulose, it is preferred to use, as the natural cellulose, a sulfite process dissolving pulp obtained by pulping by the sulfite process. When natural cellulose (such as a kraft process dissolving pulp) obtained by another method is used in the cellulose slurry, it is likely to become difficult to satisfactorily solubilize the cellulose. The reason for this is considered as follows. As mentioned above, the higher the degree of breakdown of the intramolecular hydrogen bonds in cellulose, the higher the solubilization of the cellulose becomes. Therefore, it is considered that the high solubility of the sulfite process dissolving pulp is caused by the high degree of breakdown of the intramolecular hydrogen bonds in the pulp. In fact, with respect to the degree of breakdown of the intramolecular hydrogen bonds, a sulfite process dissolving pulp has a higher degree than that of a kraft process dissolving pulp.

The viscosity average degree of polymerization (DPc) of cellulose is an important parameter for controlling the solubility of the cellulose. Examples of methods for adjusting the DPc value of cellulose include a steam explosion method, an acid hydrolysis, an alkali hydrolysis, an electron ray irradiation method, a γ-ray irradiation method and a mechanical pulverization (including a wet pulverization). However, in the alkali hydrolysis, when cellulose is contacted with an aqueous alkali solution having a high alkali concentration, there is a danger that the cellulose cannot be highly solubilized due to the formation of an insoluble substance. For example, in the alkali hydrolysis using an aqueous sodium hydroxide solution, when the alkali concentration of the aqueous sodium hydroxide solution is 10% by weight or more, a part of the cellulose is converted to an alkali cellulose. The alkali cellulose is insoluble in the aqueous sodium hydroxide solution, so that it becomes difficult to solubilize the cellulose highly.

When the viscosity average degree of polymerization (DPc) of cellulose is adjusted by the steam explosion method, it is possible to obtain cellulose having a high degree of breakdown of the intramolecular hydrogen bonds, as compared to that of a kraft process dissolving pulp.

When a sulfite process dissolving pulp or regenerated cellulose is used in the cellulose slurry, in many cases, the adjustment of the DPc value of the material cellulose is not necessary.

The viscosity average degree of polymerization (DPc) of cellulose in the cellulose slurry varies depending on various factors, such as the desired properties of a cellulose shaped article to be produced, and the desired degree of the stability of the cellulose dope during the course of the production. It is preferred that the viscosity average degree of polymerization (DPc) is from 350 to 1,200, more advantageously from 400 to 1,000. When the viscosity average degree of polymerization (DPc) is less than 350, the mechanical strength of a cellulose shaped article produced becomes low.

The above-mentioned cellulose is dispersed in an aqueous sodium hydroxide solution so as to obtain a cellulose slurry which contains particulate cellulose having an average particle diameter of 30 μm or less, preferably 20 μm or less, and which has a sodium hydroxide concentration of from 0.5 to less than 6.5% by weight and a cellulose content of 5% by weight or more.

The above-mentioned operation for dispersing the cellulose in the aqueous sodium hydroxide solution is conducted so as to increase the surface area of the cellulose, thereby increasing the rate of dissolution of the cellulose. On this point, an explanation is made below. The rate of dissolution of cellulose into an aqueous alkali solution is markedly low, as compared to the rate of dissolution of cellulose into an aqueous cuprammonium solution or an aqueous Cadoxen solution. Therefore, when cellulose is added to an aqueous alkali solution and the resultant mixture is allowed to stand, the dissolution of the cellulose apparently stops. Therefore, it is necessary to promote the dissolution of the cellulose by stirring. However, for the reason mentioned below, it is not preferred to stir at a high speed in the step for dissolving the cellulose into the aqueous alkali solution. In the present invention, the surface area of the cellulose is increased so as to enable the dissolution of the cellulose into the aqueous alkali solution by stirring at a low speed.

When the particulate cellulose has an average particle diameter of more than 30 μm, not only is the dissolution ratio (Sc) of the cellulose low, but also the cellulose dope has low stability and is susceptible to gelation.

As a method for obtaining the cellulose slurry, there can be mentioned wet pulverization. With respect to the wet pulverization, an explanation is made below.

The wet pulverization is a method in which cellulose is subjected to pulverization in an aqueous medium, thereby obtaining a slurry comprising particulate cellulose having a desired particle size dispersed in the aqueous medium.

Examples of aqueous media include water and an aqueous sodium hydroxide solution having a sodium hydroxide concentration of less than 6.5% by weight, preferably from 2 to 5% by weight. When the wet pulverization of cellulose is conducted in an aqueous sodium hydroxide solution having a sodium hydroxide concentration of 6.5% by weight or more, the cellulose is partially and heterogeneously dissolved in the solution, so that the dissolution ratio (Sc) of the cellulose in the cellulose dope is markedly low.

As specific methods for performing the wet pulverization for increasing the surface area of the cellulose, there can be mentioned a method in which cellulose is pulverized into particles and a method in which cellulose is pulverized into microfibrils by the use of a stone mill type wet pulverizer or the like. Of these two methods, the former is employed in the present invention.

The slurry obtained by the former has a low viscosity. Therefore, it is easy to conduct a homogeneous and efficient stirring in the step for dissolving the cellulose in the slurry.

On the other hand, when the latter is employed, a slurry containing microfibrillated cellulose is obtained. Such a slurry has a very high viscosity and exhibits gelation even when the slurry has a low content of cellulose solids. Therefore, the slurry is disadvantageous in that it is difficult to stir the slurry in the step for dissolving the cellulose in the slurry.

With respect to the apparatus used for the wet pulverization, there is no particular limitation as long as the apparatus is capable of pulverizing cellulose to the extent that the average particle diameter of the cellulose becomes 30 μm or less, preferably 20 μm or less. Preferred examples of such apparatuses include a stirred medium wet grinding apparatus described in Unexamined Japanese Patent Application Laid-Open Specification No. 3-163135.

With respect to the amounts of the cellulose and the aqueous medium used in the wet pulverization, there is no particular limitation. However, when the slurry obtained by the wet pulverization has a cellulose content of more than 15% by weight, it is likely that the viscosity of the slurry becomes markedly high, so that the handling of the slurry becomes difficult. Therefore, generally, the amounts of the cellulose and the aqueous medium are adjusted so that the slurry has a cellulose content of 15% by weight or less.

When the thus obtained slurry has a sodium hydroxide concentration of from 0.5 to less than 6.5% by weight, the obtained slurry as such can be used as the cellulose slurry in the steps (2) and (3) (which are mentioned above and explained below in detail). If desired, prior to the steps (2) and (3), the sodium hydroxide concentration of the slurry may be further adjusted within the above-mentioned range. On the other hand, when the obtained slurry has a sodium hydroxide concentration of less than 0.5% by weight, a high concentration aqueous sodium hydroxide solution or solid sodium hydroxide is added to the slurry so as to adjust the sodium hydroxide concentration to be in the range of from 0.5 to less than 6.5%, and the resultant slurry is used as the cellulose slurry in the steps (2) and (3).

With respect to the cellulose content of the cellulose slurry, the content needs to be adjusted to 5% by weight or more. When the content is less than 5% by weight, the cellulose dope obtained has a disadvantageously low cellulose content (Cc), so that it becomes difficult to produce from the cellulose dope a cellulose shaped article having a strength sufficient for practical use.

It is required that the above-mentioned cellulose slurry satisfy the following formula (2):

$$\sigma_T = K_1 \exp(k_1 C_{Na}) \qquad (2)$$

wherein:

$\sigma_T$ represents the yield stress (Pa) of the slurry, $K_1$ represents an arbitrary constant (Pa), $k_1$ is 0 or less, and $C_{Na}$ is the sodium hydroxide concentration (% by weight) of the slurry.

The above-mentioned formula (2) means that, when the natural logarithmic values of the yield stresses ($\sigma_T$) of the slurry are plotted against the sodium hydroxide concentration ($C_{Na}$) values of the slurry, a straight line having a gradient of 0 or less is obtained. The formula (2) also shows that, when the sodium hydroxide concentration ($C_{Na}$) of the slurry increases, the yield stress ($\sigma_T$) of the slurry decreases or does not change and, hence, the viscosity of the slurry decreases or does not change. This feature is one of the essential features of the present invention and, as explained below, is quite unexpected.

In general, in a conventional slurry obtained by dispersing a substance in a particulate form in a solution, the viscosity of the slurry increases as the concentration of the solution increases. Therefore, the above-mentioned slurry satisfying the above-mentioned formula (2) has a quite unexpected property, completely differing from the case of the conventional slurry.

By virtue of this property, in the method of the present invention, vigorous stirring is not necessary in the step for dissolving the cellulose in the slurry. This is considered to contributes to the establishment of the effect of the method of the present invention, i.e., the effect that it is possible to produce a cellulose dope which has a high content of cellulose having a high degree of polymerization and which is stable and free from gelation.

The determination as to whether or not a cellulose slurry satisfies formula (2) above can be easily conducted by the following method.

First, the weight of the cellulose slurry and the yield stress of the cellulose slurry are measured. The found value of the yield stress is denoted as "$\sigma_T 1$".

Next, a portion of the slurry is weighed and then, subjected to an appropriate analysis, such as neutralization titration, to determine the sodium hydroxide concentration of the slurry. The found value of the sodium hydroxide concentration is denoted as "$C_{Na}1$".

Further, another portion of the slurry is taken, and an appropriate amount of sodium hydroxide is added to the taken slurry, thereby obtaining an additional sodium hydroxide-containing slurry. The sodium hydroxide concentration of the additional sodium hydroxide-containing slurry is denoted as "$C_{Na}2$". This can be easily calculated from the above-mentioned $C_{Na}1$.

Then, the yield stress of the additional sodium hydroxide-containing slurry is measured. The found value of the yield stress of the additional sodium hydroxide-containing slurry is denoted as "$\sigma_T 2$".

Based on the thus obtained values $\sigma_T 1$, $\sigma_T 2$, $C_{Na}1$ and $C_{Na}2$, the natural logarithmic values of the yield stresses of the slurry (i.e., the natural logarithmic values of $\sigma_T 1$ and $\sigma_T 2$) are plotted against the sodium hydroxide concentrations (not logarithmic values) (i.e., $C_{Na}1$ and $C_{Na}2$) to obtain a straight line. When the gradient of the straight line is 0 or less, it follows that the cellulose slurry satisfies formula (2) above.

Usually, the cellulose slurry obtained by the above-mentioned wet pulverization satisfies formula (2) above.

Further, in the solid state NMR analysis of the above-mentioned cellulose slurry used in the present invention, the cellulose in the slurry exhibits a non-crystallinity ($\chi am$) of 0.5 or more, wherein the non-crystallinity is defined by the following formula (3):

$$\chi am = I_{high}/(I_{high}+I_{low}) \quad (3)$$

wherein:
$\chi am$ is the non-crystallinity of the cellulose in the slurry, and
$I_{high}$ and $I_{low}$ respectively represent the ratios of the areas of the peaks in a solid state NMR spectrum of the slurry, wherein the peaks are, respectively, ascribed to the higher magnetic field component and lower magnetic field component of the 4-position carbon atoms of the glucose units of the cellulose in the slurry, and wherein separation between the peaks respectively ascribed to the higher magnetic field component and the lower magnetic field component is made using a method in which each of the peaks is approximated to the Gaussian distribution function.

The non-crystallinity $\chi am$ of the cellulose in the slurry corresponds to the ratio of a specific region in the cellulose wherein the specific region indicates a portion in which the conformation of the cellulose molecules has a high degree of freedom.

As mentioned above, the degree of freedom of conformation of cellulose molecules is extremely low, but the degree of freedom is not zero. That is, the cellulose molecules have regions having a high degree of freedom of conformation as well as regions having a low degree of freedom of conformation. Needless to say, the solubilization of cellulose is achieved by increasing the ratio of the regions having a high degree of freedom of conformation.

The ratio of the regions having a high degree of freedom of conformation and the regions having a low degree of freedom of conformation can be determined from the areas of peaks observed in a solid state $^{13}$C-NMR spectrum of the above-mentioned slurry, which peaks are ascribed to the 4-position carbon atoms (C4) of the glucose units of the cellulose in the slurry.

Usually, in the above-mentioned solid state NMR spectrum of the slurry, two peaks are observed in the range of from 85 to 95 ppm. Of these two peaks, the peak observed in the higher magnetic field is ascribed to the 4-position carbon atoms (C4 atoms) of the glucose units present in the regions having a high degree of freedom of conformation (such carbon atoms are collectively referred to as the "higher magnetic field component"). On the other hand, the peak observed in the lower magnetic field is ascribed to the 4-position carbon atoms (C4 atoms) of the glucose units present in the regions having a low degree of freedom of conformation (such carbon atoms are collectively referred to as the "lower magnetic field component"). Generally, the area of a peak observed in an NMR spectrum is proportional to the number of atoms (carbon atoms in the case of the above solid state $^{13}$C-NMR spectrum) to which the peak is ascribed. Therefore, the ratio between the regions having a high degree of freedom of conformation and the regions having a low degree of freedom of conformation is approximately the same as the ratio between the area of the peak observed in the higher magnetic field and the area of the peak observed in the lower magnetic field. For this reason, the non-crystallinity $\chi am$ of the cellulose in the slurry can be used as an index of the degree of freedom of conformation of cellulose molecules.

However, usually, the above-mentioned two peaks (respectively ascribed to the higher magnetic field component and the lower magnetic field component) in the solid state NMR spectrum overlap, so that the correct ratio between the peak areas cannot be directly obtained from the solid state NMR spectrum. For this reason, separation between the two peaks is made using a method in which each of the peaks is approximated to the Gaussian distribution function. Such a method for separation is an established method in this field and can be easily conducted by computer processing of the data of the above-mentioned solid state NMR spectrum.

With respect to the above-mentioned slurry used in the present invention, the above-mentioned non-crystallinity $\chi am$ of the cellulose is as high as 0.5 or more.

For example, when the cellulose slurry used in the present invention is prepared by using an aqueous sodium hydroxide solution having a sodium hydroxide concentration of 2% by weight, the non-crystallinity χam of the cellulose in the resultant slurry is as high as 0.6. On the other hand, when a cellulose slurry is prepared by using water instead of the aqueous sodium hydroxide solution, the non-crystallinity χam of the cellulose in the resultant slurry is as low as about 0.45. This clearly shows that the cellulose in the slurry produced by using an aqueous sodium hydroxide solution has a very high degree of freedom of conformation, as compared to that of the cellulose in the slurry produced by using water instead of the aqueous sodium hydroxide solution.

It is considered that this high non-crystallinity χam of the cellulose contributes to the establishment of the above-mentioned unique relationship between the yield stress $\sigma_T$ of the slurry and the sodium hydroxide concentration $C_{Na}$ of the slurry.

Usually, in the solid state NMR analysis of the cellulose slurry obtained by the above-mentioned wet pulverization, the cellulose in the slurry exhibits a non-crystallinity χam of 0.5 or more.

In the present invention, it is preferred that the above-mentioned cellulose slurry satisfies the following formula (4):

$$\sigma_T = K_2 + k_2 DPc \quad (4)$$

wherein:
$\sigma_T$ represents the yield stress (Pa) of the slurry,
$K_2$ represents an arbitrary constant (Pa),
$k_2$ is 0 or less (Pa), and
DPc represents the viscosity average degree of polymerization of the cellulose in the slurry.

Formula (4) above means that, when the values of yield stresses ($\sigma_T$) are plotted against the values of viscosity average degrees (DPc) of polymerization of the cellulose, a straight line having a slope of 0 or less is obtained. In other words, formula (4) above means that, when the viscosity average degree DPc of polymerization of the cellulose increases, the yield stress ($\sigma_T$) of the cellulose slurry does not change or decrease and, accordingly, the viscosity of the cellulose slurry does not change or decrease. As explained below, it is surprising that the above-mentioned cellulose slurry exhibits such a unique characteristic.

In general, in a conventional slurry obtained by dispersing particulate polymer, the viscosity of the slurry increases as the molecular weight (or degree of polymerization) of the polymer increases. Therefore, the above-mentioned cellulose slurry satisfying formula (4) above has a quite unexpected characteristic, which is completely different from that of the conventional cellulose slurry.

The determination as to whether or not a cellulose slurry satisfies formula (4) above can be easily conducted by the following method.

First, the weight of the cellulose slurry and the yield stress of the cellulose slurry are measured. The found value of the yield stress is defined as "$\sigma_T 3$".

Next, a portion of the slurry is weighed and then, subjected to an appropriate analysis, such as neutralization titration, to determine the sodium hydroxide concentration of the slurry. The found value of the sodium hydroxide concentration is denoted as "$C_{Na}3$".

Further, another portion of the slurry is taken and subjected to vacuum drying. The weight of the resultant residue (containing particulate cellulose and sodium hydroxide) is measured, and the cellulose content of the slurry is calculated from the weight of this residue and the above-mentioned $C_{Na}3$. The obtained value of the cellulose content is denoted as "Ccs3".

Next, using the above-obtained residue, the viscosity average degree of polymerization of the particulate cellulose in the cellulose slurry is measured. The found value of the viscosity average degree of polymerization is denoted as "DPc1".

Further, using particulate cellulose having a viscosity average degree DPc2 (≠DPc1) of polymerization, a cellulose slurry having a cellulose content of Ccs3 and a sodium hydroxide concentration of $C_{Na}3$ is prepared by the above-mentioned wet pulverization, and the yield stress of the resultant slurry is measured. The found value of the yield stress is denoted as "$\sigma_T 4$".

The above-obtained values of yield stresses of the slurry (i.e., $\sigma_T 3$ and $\sigma_T 4$) are plotted against the above-obtained values of viscosity average degrees of polymerization (i.e., DPc1 and DPc2), so as to obtain a straight line. When the gradient of the straight line is 0 or less, it follows that the cellulose slurry satisfies formula (4) above.

In many cases, the cellulose slurry obtained by the above-mentioned wet pulverization satisfies formula (4) above.

With respect to the cellulose molecules in the cellulose slurry obtained by the above-mentioned method, the degree of breakdown of the intramolecular hydrogen bonds is considerably high, so that the cellulose in the slurry has a high degree of freedom of conformation. As a result, the solubility of cellulose (present in the cellulose slurry) in an aqueous sodium hydroxide solution becomes relatively high, so that the cellulose slurry can be used for producing a cellulose dope which has dissolved therein, in a high concentration, a cellulose having a high degree of polymerization, and which cellulose dope is stable and free from gelation.

The reason for this high degree of breakdown of the intramolecular hydrogen bonds in the cellulose molecules present in the cellulose slurry obtained by the above-mentioned method has not yet been elucidated. However, it is possible that the above-mentioned high degree of breakdown of the intramolecular hydrogen bonds has a correlation with the observation results of the Raman spectrum of an aqueous sodium hydroxide solution and the NMR spectrum of a conventional cellulose dope, which observation results are reported in the documents described below.

The positions of peaks (representing the stretching vibration of an O—H group and the deformation vibration of an O—H group) observed in the Raman spectrum of an aqueous sodium hydroxide solution having a sodium hydroxide concentration in the range of from 2 to 5% by weight are slightly different from those of peaks observed in the Raman spectrum of an aqueous sodium hydroxide solution having a sodium hydroxide concentration outside the above-mentioned range (*Polymer Journal*, 20, 447 (1988)). The reason for this is presumed as follows.

Generally, in an aqueous sodium hydroxide solution having a sodium hydroxide concentration of 6% by weight or less, each sodium ion is hydrated with 4 moles or more of water molecules by coordination. When the sodium hydroxide concentration is in the range of from 2 to 5% by weight, energy exchange occurs between water molecules coordinated to sodium ions (coordinated water) and water molecules not coordinated to sodium ions (free water), which energy exchange causes the change in the positions of peaks observed in a Raman spectrum.

Further, the NMR spectrum of a conventional cellulose dope suggests that the electron densities around the atomic nuclei of C2 and C3 change due to the presence of sodium ions positioned close to the hydroxyl group bonded to C2 (*Polymer Journal*, 17, 707(1985)).

Next, an explanation is made with respect to the above-mentioned steps (2) and (3) of the method of the present invention.

In the above-mentioned step (2), the sodium hydroxide concentration of the cellulose slurry provided in the above-mentioned step (1) is adjusted to 6.5 to 11% by weight.

In the above-mentioned step (3), the cellulose slurry is stirred at 10° C. or less by means of a stirrer under stirring conditions satisfying at least one requirement selected from the group consisting of the requirement that the stirring is performed at a shear rate of 9,000/sec or less and the requirement that the stirring is performed at a stirring speed of 500 m/min or less in terms of the speed at which an outer end of an agitating element of the stirrer is rotated, thereby causing the particulate cellulose to be dissolved in the cellulose slurry to the extent that the cellulose has a dissolution ratio of 99.0% by weight or more, to obtain a cellulose dope.

The above-mentioned steps (2) and (3) can be conducted in the order of step (2) and step (3) or simultaneously.

In step (2) of the method of the present invention, it is preferred that the sodium hydroxide concentration of the cellulose slurry is adjusted by the following method.

First, the cellulose slurry provided in the above-mentioned step (1) is cooled to 10° C. or less, usually to a temperature in the range of from 0 to –3° C. Subsequently, to the resultant cellulose slurry is added an aqueous sodium hydroxide solution which has been cooled to 10° C. or less, usually to a temperature in the range of from –10 to –18° C., so as to adjust the sodium hydroxide concentration of the cooled cellulose slurry to 6.5 to 11% by weight, preferably 7 to 10% by weight.

The sodium hydroxide concentration of the above-mentioned aqueous sodium hydroxide solution is appropriately selected so as to obtain a cellulose dope having a desired sodium hydroxide concentration. However, it is generally in the range of from 10 to 45% by weight.

It is especially preferred that the aqueous sodium hydroxide solution is cooled to a temperature as low as possible, as long as the aqueous sodium hydroxide solution does not freeze. However, generally, the solution is cooled to a temperature in the range of from –10 to –18° C., and it is not necessary to cool the solution to a temperature lower than this range. The cooling of the solution to the above-mentioned temperature range can be easily conducted by cooling the aqueous sodium hydroxide solution by means of a conventional freezer.

When the above-mentioned aqueous sodium hydroxide solution is cooled (by means of a freezer) to a temperature in the range of from –10 to –18° C., the solution may freeze depending on the sodium hydroxide concentration of the solution. In such a case, the solution is cooled to a temperature as low as possible within the range of from less than 10° C. to –10° C., at which the solution does not freeze.

After the sodium hydroxide concentration of the cellulose slurry is adjusted by the above-mentioned method, the cellulose slurry is stirred by means of a stirrer, thereby causing the particulate cellulose to be dissolved in the cellulose slurry, to obtain a cellulose dope.

This operation must be conducted at a temperature of 10° C. or less. When this operation is conducted at a temperature of more than 10° C., the particulate cellulose is not satisfactorily solubilized, so that the resultant cellulose dope becomes unstable and susceptible to gelation.

Further, the stirring of the cellulose slurry by means of a stirrer is conducted under stirring conditions satisfying at least one requirement selected from the group consisting of the requirement that the stirring is performed at a shear rate of 9,000/sec or less and the requirement that the stirring is performed at a stirring speed of 500 m/min or less in terms of the speed at which the outer end of an agitating element of the stirrer is rotated.

The speed at which the outer end of an agitating element of the stirrer is rotated can be obtained by the following formula:

Speed at which the outer end of an agitating element of the stirrer is rotated (m/min)=revolution rate (rpm) of the agitating element of the stirrer× diameter (m) of the agitating element of the stirrer×3.14

The above-mentioned shear rate corresponds to the value obtained by dividing the above-mentioned speed (at which the outer end of an agitating element of the stirrer is rotated) by the distance between the outer end of an agitating element of the stirrer and the inner wall of an agitating vessel (in which the cellulose slurry is stirred) equipped with the stirrer.

The rate of dissolution of cellulose into an aqueous alkali solution is markedly lower than the rate of dissolution of cellulose into an aqueous cuprammonium solution or an aqueous Cadoxen solution. Therefore, when cellulose is added to an aqueous alkali solution and the resultant mixture is allowed to stand without stirring, the dissolution of the cellulose apparently stops, so that the dissolution ratio (Sc) of the cellulose becomes only less than 50%. Therefore, it is necessary to promote the dissolution of the cellulose by stirring.

In general, if the stirring is performed by means of a mixer or the like capable of stirring at a high speed, the dissolution rate can be increased. However, when a high speed stirring is performed, even if the average temperature of the whole system is kept at 10° C. or less, a local heat generation occurs, so that the stability of the resultant cellulose dope is lowered and gelation is likely to occur. Further, with respect to the solubility of the cellulose in an aqueous alkali solution, the higher the temperature of the cellulose, the lower the solubility of the cellulose becomes. Therefore, it is not preferred that the temperature of a cellulose slurry is elevated due to a local heat generation accompanying a high speed stirring.

For these reasons, in the present invention, it is required that the stirring of a cellulose slurry be performed at a low speed.

The above-mentioned cellulose slurry satisfies formula (2) above and, preferably, both of formula (2) above and formula (4) above. This means that, the above-mentioned cellulose slurry has a characteristic that, even if the sodium hydroxide concentration ($C_{Na}$) of the slurry is increased, the viscosity of the slurry does not increase, and that it is preferred that, in addition to the above characteristic, the above-mentioned cellulose slurry has a characteristic that, even if the viscosity average degree of polymerization (DPc) of the cellulose is increased, the viscosity of the slurry does not increase. Accordingly, by using the above-mentioned cellulose slurry, a cellulose dope which is stable and unlikely to exhibit gelation can be obtained.

In the present invention, there is no particular limitation with respect to the stirrer for conducting the above-mentioned stirring, as long as the stirrer is capable of stirring the cellulose slurry under the above-mentioned stirring conditions. Examples of stirrers which can be used in the present invention include a single-screw kneader and a twin-screw kneader. The above-mentioned stirring can be conducted either in a batchwise manner or in a continuous manner.

For easy understanding of the importance of the above-described stirring conditions, an illustrative explanation is made below with respect to the relationship between the stirring conditions for dissolving the cellulose in a cellulose slurry and the stability of the resultant cellulose dope.

Taken as an example is the preparation of a cellulose dope which contains cellulose having a viscosity average degree of polymerization (DPc) of 450 and which has a cellulose content (Cc) of 5% by weight. In this case, when a cellulose slurry is subjected to a high speed stirring by using a stirrer under stirring conditions wherein the stirring is performed at a shear rate of 17,000/sec and a stirring speed of 1,020 m/min in terms of the speed at which the outer end of an agitating element of the stirrer is rotated (wherein as a stirrer, T. K. HOMO-MIXER, manufactured and sold by TO-KUSHU KIKA KOGYO Co., Ltd., Japan, is used under conditions that the revolution rate of the agitating element thereof is set at 12,000 rpm), or when a cellulose slurry is subjected to a high speed stirring by using a stirrer under stirring conditions wherein the stirring is performed at a shear rate of 9,400/sec and a stirring speed of 570 m/min in terms of the speed at which the outer end of an agitating element of the stirrer is rotated (wherein as a stirrer, S-1 Mixer SMJ-40 (equipped with a stirring vessel having an internal volume of 64 ml), manufactured and sold by SAKURA SEI-SAKUSHO Ltd., Japan, is used under conditions that the revolution rate of the agitating element thereof is set at 4,500 rpm), even if the average temperature of the slurry is kept at −2° C. or less during the stirring for dissolving the cellulose, gelation proceeds immediately after the dissolution of the cellulose (i.e., preparation of a cellulose dope) and, hence, the desired cellulose dope cannot be obtained.

On the other hand, when the same procedure as described above for preparing the above-mentioned cellulose dope is performed except that the cellulose slurry is subjected to a low speed stirring under stirring conditions wherein the stirring is performed at a shear rate of 2,000/sec and a stirring speed of 120 m/min in terms of the speed at which the outer end of an agitating element of the stirrer is rotated, the resultant cellulose dope is stable for one week or more and free from gelation, and the dissolution ratio (Sc) of the cellulose in the cellulose dope is 99.0% by weight or more.

Further, when a cellulose slurry is subjected to a low speed stirring in the same manner as mentioned above, even if the cellulose in the slurry has a viscosity average degree of polymerization (DPc) as high as 800, the resultant cellulose dope is also stable for one week or more and free from gelation, and the dissolution ratio (Sc) of the cellulose in the cellulose dope is 99.0% by weight or more.

In the above-mentioned step (3), the particulate cellulose is dissolved to the extent that the cellulose has a dissolution ratio (Sc) of 99.0% by weight or more. When the Sc is lower than 99.0% by weight, as mentioned above, the filter (for removing the cellulose remaining undissolved in the cellulose dope) is frequently clogged, so that a commercial scale production of a fiber, a film or the like becomes practically impossible.

The cellulose dope of the present invention, which is obtained by the above-mentioned method, is stable and free from gelation even when the cellulose dope has a high content of cellulose having a high degree of polymerization. Therefore, from the cellulose dope of the present invention, a cellulose shaped article (such as a fiber, a film, a particle, a sponge or the like) having high mechanical strength can be stably and efficiently produced by a commercially acceptable coagulation method without using a special molding apparatus.

From the viewpoint of reducing the cost for producing the cellulose shaped article, it is preferred that the cellulose content (Cc) of the cellulose dope is increased, while keeping the dissolution ratio (Sc) of the cellulose in the cellulose dope at 99.0% by weight or more. For attaining this objective, it is very effective to partially modify the hydroxyl groups of the cellulose in the cellulose slurry by reaction with a reagent which is reactive with a hydroxyl group in the presence of an alkali. Examples of such reagents include a vinyl compound, an etherification agent and a xanthation agent. When such a reagent is not used, the cellulose content (Cc) of the cellulose dope of the present invention is usually in the range of from 6 to 7% by weight. On the other hand, by employing the above-mentioned modification of the hydroxyl groups of the cellulose, the cellulose content (Cc) of the cellulose dope can usually be increased to the range of from 8 to 9% by weight. This cellulose content is about the same as the cellulose content (8.5% by weight) of the cellulose dope (viscose) used in the conventional viscose process.

In the present invention, it is preferred that the above-mentioned reagent is selected from the group consisting of an etherification agent and a xanthation agent.

Generally, when cellulose is reacted with the above-mentioned reagent in order to render the cellulose water-soluble, it is considered appropriate to use the reagent in an amount of from 0.3 to 1.2 mole per mole of glucose units in the cellulose. However, with respect to the cellulose dope of the present invention, when the amount of the reagent is in the above-mentioned range, it is possible that the mechanical strength of the cellulose shaped article (especially the mechanical strength exhibited when the article is in a wet state) is greatly lowered. Therefore, in the present invention, it is preferred that the amount of the reagent is 0.1 mole or less per mole of glucose units in the cellulose in the cellulose dope. When this amount of the reagent is used, the cellulose content (Cc) of the cellulose dope can be increased to a satisfactorily high level while keeping the dissolution ratio (Sc) of the cellulose in the cellulose dope at 99.0% by weight or more. Further, this amount of the reagent is considerably lower than the amount of the reagent used in the conventional viscose process.

Addition of the reagent can be conducted in an appropriate stage in the process for producing the cellulose dope of the present invention. In the present invention, it is preferred that the reagent is added to the cellulose slurry at a point in time which is after step (1) and before the end of step (3).

The cellulose dope obtained in this manner (wherein the hydroxyl groups of the cellulose are partially modified) also exhibits a zero-shear viscosity ($\eta_0$) which satisfies the above-mentioned formula (1). Further, usually, in the NMR analysis of such cellulose dope, the 6-position carbon atoms of the glucose units of the cellulose exhibit a longitudinal relaxation time ($\tau c$) of from 10 to 400 ms, and the 1-position carbon atoms of the glucose units of the cellulose exhibit a longitudinal relaxation time ($\tau c$) of from 200 to 10,000 ms.

By subjecting the cellulose dope of the present invention to an appropriate coagulation treatment, a cellulose shaped article can be obtained. Examples of cellulose shaped articles include a fibrous body, a flat film, a tubular film, a hollow fiber, a particle, a sponge body and a coating.

In the present invention, it is preferred that the coagulation treatment is selected from the group consisting of drying coagulation, gelation coagulation and neutralization coagulation. Hereinbelow, an explanation is made with respect to these coagulation treatments.

<Drying Coagulation>

Drying coagulation is a method for coagulating a cellulose dope to obtain a cellulose shaped article, which comprises drying a cellulose dope so as to precipitate the cellulose in the cellulose dope. Drying coagulation is advantageous in that the cellulose shaped article obtained by drying coagulation has very high structural density and very high mechanical strength, as compared to those properties of the shaped articles obtained by other coagulation methods. Further, the shaped article obtained by drying coagulation has an extremely low permeability with respect to various substances, such as water.

For example, with respect to a film obtained by subjecting the above-mentioned cellulose dope to drying coagulation, the water permeability of the film is about 0.1 liter/$(m^2 \cdot hr \cdot kg/cm^2)$. This water permeability of the film is considerably smaller than the water permeability (about 1 to 5 liters/$(m^2 \cdot hr \cdot kg/cm^2)$) of a commercially available reverse osmosis membrane. This means that the above-mentioned film exhibits a substantially complete water barrier property.

Also, the above-mentioned film exhibits an oxygen permeability of about 50 $cc/m^2/24$ hr/atm, as measured at 23° C. and a relative humidity of 65%. That is, the above-mentioned film exhibits an extremely low gas permeability (i.e., excellent gas barrier property).

Further, the above-mentioned shaped article (film) exhibits an extremely low oil permeability. For example, with respect to a cellulose-coated article obtained by a method in which the above-mentioned cellulose dope is coated on the surface of a paper sheet and the resultant dope film is subjected to drying coagulation to thereby form a cellulose coating, when the oil resistance of the cellulose coating is measured in accordance with the TAPPI RC-338 method, the cellulose coating exhibits a Kit value of 12 or more. (The "Kit value" is an index of the oil resistance of an oil resistant paper. The higher the Kit value, the higher the oil resistance. With respect to the Kit value, see item (11) of the section below which explains the measuring methods used in the below-described Examples and Comparative Examples.) The Kit value of 12 or more is far higher than the Kit value of a commercially available oil resistant paper. The surface of the cellulose coating exhibits a slight hydrophobicity, and exhibits a contact angle of 500 or more with water.

The mechanical strength of the cellulose shaped article obtained by subjecting the above-mentioned cellulose dope to drying coagulation is very high, as compared to that of a cellulose shaped article obtained by subjecting to drying coagulation the conventional cellulose dope (i.e., a cellulose dope in which the cellulose content (Cc) is less than 4% by weight and the viscosity average degree of polymerization (DPc) of the cellulose is less than 350).

<Gelation Coagulation>

Cellulose can be dissolved only in an aqueous sodium hydroxide solution having a specific sodium hydroxide concentration ($C_{Na}$), i.e., a sodium hydroxide concentration of from 6.5 to 11% by weight. In other words, when a solution obtained by dissolving cellulose in an aqueous sodium hydroxide solution (i.e., a cellulose dope) is contacted with a liquid other than an aqueous sodium hydroxide solution having a sodium hydroxide concentration of from 6.5 to 11% by weight, gelation occurs. Therefore, a liquid other than an aqueous sodium hydroxide solution having a sodium hydroxide concentration of from 6.5 to 11% by weight can be used as a gelling agent for the above-mentioned cellulose dope.

With respect to the liquid used as a gelling agent, water and aqueous solutions can be preferably used. When an aqueous solution of a salt is used as a gelling agent, the higher the concentration of the salt in the solution and the lower the gelation temperature, the higher the structural density and the mechanical strength of the obtained cellulose shaped article.

On the other hand, a cellulose shaped article obtained by subjecting a dope to gelation coagulation using hot water as a gelling agent exhibits a lowest structural density and lowest mechanical strength. However, the mechanical strength of such a cellulose shaped article is satisfactorily high, as compared to that of a cellulose shaped article obtained by subjecting to gelation coagulation the conventional cellulose dope (i.e., a cellulose dope in which the cellulose content (Cc) is less than 4% by weight and the viscosity average degree of polymerization (DPc) of the cellulose is less than 350).

<Neutralization Coagulation>

In the case of the neutralization coagulation, the structure and mechanical properties of the obtained cellulose shaped article are largely affected by the concentration and temperature of the aqueous acidic solution used for neutralization. The higher the concentration of the aqueous acidic solution and the lower the temperature of the aqueous acidic solution, the higher the structural density and the mechanical strength of the obtained cellulose shaped article. Therefore, the concentration and temperature of the aqueous acidic solution are appropriately selected in accordance with the structural density and mechanical properties desired for the cellulose shaped article.

A cellulose shaped article obtained by subjecting a dope to neutralization coagulation using a hot aqueous acidic solution exhibits a low mechanical strength. However, the mechanical strength of such a cellulose shaped article is satisfactorily high, as compared to that of a cellulose shaped article obtained by subjecting to neutralization coagulation the conventional cellulose dope (i.e., a cellulose dope in which the cellulose content (Cc) is less than 4% by weight and the viscosity average degree of polymerization (DPc) of the cellulose is less than 350).

Examples of aqueous acidic solutions which can be used in the present invention include aqueous solutions of acids, such as sulfuric acid, acetic acid, thiosulfuric acid, sulfurous acid, hydrochloric acid, hydrobromic acid, hydrofluoric acid, nitric acid, phosphoric acid, pyrophosphoric acid, metaphosphoric acid, polyphosphoric acid, hypophosphorous acid, trifluoroacetic acid, thiocyanic acid and the like; and aqueous solutions of salts of the above-mentioned acids. These aqueous acidic solutions can be used individually or in combination.

As described above, the structural density and mechanical properties of the cellulose shaped article can be greatly controlled by appropriately selecting the type of coagulation treatment and controlling the conditions for the coagulation treatment.

Further, in any case, since the cellulose shaped article of the present invention is produced from the above-mentioned cellulose dope in which the cellulose content (Cc) is 4% by weight or more and the viscosity average degree of polymerization (DPc) of the cellulose is 350 or more), the mechanical strength of the cellulose shaped article of the present invention is satisfactorily high, as compared to that of a cellulose shaped article obtained by coagulating the conventional cellulose dope (i.e., a cellulose dope in which the cellulose content (Cc) is less than 4% by weight and the viscosity average degree of polymerization (DPc) of the cellulose is less than 350).

The cellulose dope of the present invention can be produced without using a poisonous substance. Therefore, the cellulose dope of the present invention is suitable for producing an edible shaped article containing cellulose as a substrate (edible cellulose article).

An edible cellulose article can be obtained by subjecting to the above-mentioned coagulation treatment a cellulose dope containing at least one additive selected from the group consisting of a polysaccharide, a polypeptide and a natural resin.

In the production of the edible cellulose article, the above-mentioned reagent may be used. In the case where the reagent is used, it is preferred that the reagent is a compound which has been approved as a reagent for use in food, such as monochloroacetic acid.

Examples of methods for producing the above-mentioned cellulose dope containing an additive include:

i) a method in which the additive is dispersed or dissolved in an aqueous sodium hydroxide solution having a sodium hydroxide concentration of 6.5 to 11% by weight, preferably 7 to 10% by weight, and the resultant dispersion or solution is mixed with the above-mentioned cellulose dope; and ii) a method in which the additive is added to the above-mentioned cellulose slurry to thereby obtain a mixture, and a cellulose dope is produced in substantially the same manner as mentioned above, except that the above-obtained mixture is used in place of the above-mentioned cellulose slurry.

Examples of polysaccharides which can be used as the above-obtained additive include gum arabic, arabinogalactan, alginic acid, gum ghatti, carrageenan, gum karaya, xanthan gum, guar gum, konjak starch powder, tamarind, tara gum, gum tragacanth, furcellaran, pullulan, pectin, chitin, locust been gum, xylan, mannan, starches, and Na, K and Ca salts thereof.

Examples of polypeptides which can be used as the above-obtained additive include natural proteins, such as soybean protein, casein, albumin, globulin, gelatin and hydrolysates of these proteins, Na, K and Ca salts of these proteins, and Na, K and Ca salts of the above-mentioned hydrolysates.

Examples of natural resins which can be used as the above-obtained additive include shellac resin.

These additives can be used individually or in combination.

As apparent from the above, the cellulose dope of the present invention is stable and free from gelation even when the cellulose dope has a high content of cellulose having a high degree of polymerization. By the use of the cellulose dope of the present invention, it becomes possible to produce, without using a large amount of a poisonous substance, a regenerated cellulose shaped article (such as a fiber or a film) which has a mechanical strength sufficient for practical use. Therefore, the cellulose dope of the present invention is commercially very advantageous.

BEST MODE FOR CARRYING OUT THE INVENTION

Hereinbelow, the present invention will be described in more detail with reference to Examples and Comparative Examples, which should not be construed as limiting the scope of the present invention.

The below-mentioned methods were used for the measurement of the following properties: the dissolution ratio (Sc) of cellulose, the viscosity average degree of polymerization (DPc), the average particle diameter of particulate cellulose (μm), the viscosity characteristics of a cellulose slurry, the zero-shear viscosity ($\eta_0$) of a cellulose dope (mPa·s), the solid state NMR, the NMR longitudinal relaxation time (ms), the strength and elongation of a fiber, the water permeability, the oxygen permeability, the oil resistance and the contact angle with water.

(1) Dissolution Ratio (Sc) of Cellulose

The dissolution ratio of cellulose was obtained by a method in which the amount of cellulose (Rc) remaining undissolved in a cellulose/sodium hydroxide aqueous solution (cellulose dope) is measured in the below-described manner, and, then, a calculation is conducted using the below-mentioned formula (6). The measurement of the amount of cellulose (Rc) remaining undissolved was performed as follows. The cellulose/sodium hydroxide aqueous solution (cellulose dope) was diluted 80-fold with an aqueous 8% by weight sodium hydroxide solution to thereby obtain a diluted cellulose/sodium hydroxide aqueous solution, and the number of the undissolved cellulose particles present in 2 ml of the obtained diluted cellulose/sodium hydroxide aqueous solution was counted by means of a Coulter counter (Coulter Counter ZM80, manufactured and sold by Coulter Electronic Inc., U.S.A.). The counting was conducted with respect to cellulose particles having a particle diameter of from 3 μm to 100 μm, wherein the particle diameter range of from 3 μm to 100 μm was divided into a plurality of segments as shown in the below-mentioned formula (5). From the number obtained by the counting, the volume (Rc)(ml) of the undissolved matter present in 20 liters of the cellulose/sodium hydroxide aqueous solution was obtained using the following formula (5).

$$Rc = \{N_3 \text{ to } N_1 \times (4/3)\pi(6.5 \times 10^{-4}/2)^3 + N_{10} \text{ to } N_{20} \times (4/3)\pi(15 \times 10^{-4}/2)^3 + N_{20} \text{ to } N_{30} \times (4/3)\pi(25 \times 10^{-4}/2)^3 \ldots + N_{90} \text{ to } N_{100} \times (4/3)\pi(95 \times 10^{-4}/2)^3\} \times 80 \times (20 \times 10^3/2)$$  Formula (5)

(wherein $N_x$ to $N_y$ represents the number of particles each having a particle diameter of from x (μm) to y (μm), which are contained in 2 ml of the 80-fold diluted cellulose dope, wherein the number is counted by a Coulter counter.)

$$Sc = (1 - Rc \times S_1/(S_2 \times 20 \cdot 10^3 \times Cc/100)) \times 100$$  Formula (6)

(wherein $S_1$ represents the specific gravity of the cellulose (1.4 g/cm$^3$);

$S_2$ represents the specific gravity of the cellulose/sodium hydroxide aqueous solution (1.1 g/cm$^3$); and Cc represents the cellulose content (% by weight) of the cellulose/sodium hydroxide aqueous solution.)

(2) Viscosity Average Degree of Polymerization (DPc)

The viscosity average degree of polymerization of cellulose was obtained by the following method. The [η] value of a cellulose/Cadoxen solution was obtained, and the obtained [η] value was substituted for the [η] in the below-mentioned viscosity formula of Brown and Wikstrom (described in Euro. Polym. J, 1, 1 (1966)) to thereby obtain a viscosity average molecular weight (Mw). The obtained viscosity average molecular weight (Mw) was divided by 162, and the value obtained by the division was defined as the viscosity average degree of polymerization (DPc). The method for preparing Cadoxen is described in the above-mentioned Euro. Polym. J, 1, 1 (1966).

$$[\eta]=3.85\times10^{-2}\times MW^{0.76}$$

(3) Average Particle Diameter (μm) of Particulate Cellulose

First, a cellulose slurry was diluted with distilled water so that the cellulose content of the slurry became 0.1% by weight and, then, the cellulose particles were dispersed by ultrasonication. Subsequently, the particle size distribution of the dispersed cellulose particles was measured by means of a laser diffraction type particle size distribution measuring equipment (SALD-1100, manufactured and sold by Shimadzu Corporation, Japan). From the particle size distribution, the total volume of the cellulose particles was obtained, based on the assumption that the cellulose particles are spherical. Then, a graph showing the relationship between the particle diameters of the cellulose particles and the sum of the volumes of cellulose particles having a given particle diameter or less was obtained. In the above-mentioned graph, a specific particle diameter was obtained at which the sum of the volumes of the particles having the specific particle diameter or less is 50% of the total volume of the particles. The obtained specific particle diameter was taken as the average particle diameter of the particulate cellulose. (This method is described in detail in Unexamined Japanese Patent Application Laid-Open Specification No. 3-163135.)

(4) Viscosity Characteristics of a Cellulose Slurry

The measurement was performed using HAAKE viscometer RheoStress RS 100 Model as a measuring apparatus (cone/plate sensor system, angle: 4°, diameter: 35 mm). The measurement mode employed was stress ramp mode, and the stress range was 1 to 450 Pa, the measurement time was 300 sec, and the measurement temperature was 20° C. Based on the results of the measurement, a viscosity ($\eta_s$)-stress ($\sigma_s$) curve was obtained. The stress at which the viscosity sharply decreases (as shown in FIG. 1) was obtained in this curve and defined as the yield stress ($\sigma_T$).

(5) Zero-Shear Viscosity ($\eta_0$) of a Cellulose Dope

The measurement was performed using HAAKE viscometer RV-12 Model as a measuring apparatus (double cylinder type, rotor: MV-I). The measurement temperature was 10° C. and the viscosity was measured at various shear rates. The 0 value was obtained by a method in which the shear rates are extrapolated to 0/sec.

(6) Solid State NMR of a Cellulose Slurry

Solid state $^{13}$C-NMR measurement of a cellulose slurry was conducted by the CP/MAS method using an NMR spectrometer (DSX400, manufactured and sold by Bruker Instruments Inc., U.S.A.) under the following measuring conditions: contact time: 1 ms; pulse intervals: 5 s; 90° pulse: 4.8 μs; number of accumulations: 3000; and rotation rate: 4000 Hz.

Separation was made between the peaks respectively ascribed to the higher magnetic field component and the lower magnetic field component of the 4-position carbon atoms (C4) of the glucose units of the cellulose in the slurry, using a method in which each of the peaks is approximated to the Gaussian distribution function by using a curve fitting program "Win Fit", which is attached to the above-mentioned spectrometer.

(7) NMR Longitudinal Relaxation Time

With respect to a cellulose dope, the measurement of NMR longitudinal relaxation time (τc) was conducted using an NMR spectrometer (JNM-LA400, manufactured and sold by JEOL Ltd., Japan) under the following measuring conditions: observation frequency: 400 MHz; number of accumulations: 500; and temperature: 10° C. In the measurement, $D_2O$ and the cellulose dope were, respectively, placed in the inner tube and the outer tube of a double tube, and the proton decoupling method was used.

(8) Strength and Elongation of a Fiber

The strength and elongation of a fiber were measured in accordance with JIS L 1013-1981.

(9) Water Permeability of a Cellulose-Coated Paper

The water permeability of a cellulose-coated paper was measured by a method in which a cellulose-coated paper sheet having an area of 20 cm$^2$ is placed under a pressure of 1 atm at 25° C., and water is applied onto the cellulose-coated paper sheet, and the volume of water which has passed through the cellulose-coated paper sheet during a predetermined period of time is measured.

(10) Oxygen Permeability of a Cellulose-Coated Paper

The oxygen permeability of a cellulose-coated paper was measured with respect to a measuring area of 4 cm$^2$ in accordance with JIS K7126 (MOCON method).

(11) Oil Resistance

The measurement was performed by the TAPPI RC338 method. This method is a method in which oils respectively having predetermined different compositions are individually dropped on a coated paper sheet and whether or not the oils permeate into the coated paper sheet is visually examined. 12 types of oils having different permeation abilities are used. 12 numbers (1 to 12) are, respectively, assigned to the 12 types of oils in the order from the oil having the lowest permeation ability to the oil having the highest permeation ability. The 12 types of oils are individually dropped on the coated paper sheet in the order from the oil having the lowest permeation ability. The oils which have been found to be unable to permeate into the coated paper sheet are selected. From among the selected oils, the oil assigned the largest number (i.e., the oil having the highest permeation ability) is selected, and the number assigned to this oil is taken as the Kit value, which is used as an index of oil resistance.

(12) Contact Angle with Water

The measurement was performed by means of a CBVP-A-3 type tension meter (KYOWA KAIMEN KAGAKU CO., LTD., Japan). A specimen was horizontally held, and 2 mm$^3$ of water at 25° C. was put on the specimen by means of a micropipet which is attached to the tension meter, and the contact angle of the drop of water with the specimen was measured.

EXAMPLES 1 TO 4 AND COMPARATIVE EXAMPLES 1 TO 4

In each of Examples 1 to 4, the relationship between the yield stress ($\sigma_T$) of a cellulose slurry and the DPc of the cellulose in the slurry is examined and shown.

A sulfite process dissolving pulp (manufactured and sold by Nippon Paper Industries Co., Ltd., Japan) was hydrolyzed by the steam explosion method, thereby obtaining three types of celluloses having varied viscosity average degrees of polymerization (DPc). The obtained celluloses and the same dissolving pulp as mentioned above (without being subjected to the steam explosion) were individually mixed with sodium hydroxide so that each of the resultant four aqueous mixtures had a cellulose solids content of 8.5% by weight and a sodium hydroxide concentration of 2% by weight. The obtained four aqueous mixtures were individually subjected to wet pulverization by using a stirred medium wet grinding apparatus (PEARL Mill RL5-VS, manufactured and sold by ASHIZAWA, Ltd., Japan) for 8 minutes, thereby obtaining alkali/cellulose slurries each containing particulate cellulose having an average particle diameter of 10 to 13 μm. The obtained alkali/cellulose slurries respectively had DPc values of 350, 450, 540 and 720, and these were, respectively, identified as the slurries of Examples 1 to 4. As Comparative Examples, substantially the same procedure as described above was conducted, except that sodium hydroxide was not used (i.e., an aqueous medium containing no sodium hydroxide was used). The resultant aqueous cellulose slurries (water/cellulose slurries) respectively containing particulate celluloses having DPc values of 350, 450, 540 and 720 were, respectively, identified as the slurries of Comparative Examples 1 to 4.

In each of Examples 1 to 4, $k_2$ of the above-mentioned formula (4) was −0.05, i.e., a negative value. This means that the higher the DPc, the lower the yield stress ($\sigma_T$) of the slurry becomes (wherein the yield stress is the stress at which the viscosity of the slurry exhibits a sharp decrease). A cellulose slurry having such a property is extremely advantageous in that the cellulose contained therein can be homogeneously dissolved by gently stirring while suppressing a temperature increase. This property is especially advantageous for the dissolution of a cellulose of a high DPc. Further, in each of Examples 1 to 4, the cellulose in the slurry exhibited a non-crystallinity ($\chi am$) of 0.6, wherein the non-crystallinity is defined by the formula: $\chi am = I_{high}/(I_{high}+I_{low})$.

The non-crystallinity $\chi am$ is an index of the degree of breakdown of the intramolecular hydrogen bonds of the cellulose. The fact that in each of Examples 1 to 4 the non-crystallinity $\chi am$ is more than 0.5 shows that the degree of breakdown of the intramolecular hydrogen bonds in the cellulose in the alkali/cellulose slurry of each of Examples 1 to 4 is high and, hence, the conformation of the cellulose molecule has a high degree of freedom. This has a relationship to the fact that, as mentioned above, in each of Examples 1 to 4, $k_2$ of formula (4) is a negative value. It is considered that when cellulose in such a state is dissolved, the entropy of the system becomes satisfactorily high, so that the cellulose in the cellulose slurry of each of Examples 1 to 4 can be easily dissolved.

As mentioned above, the rate of dissolution of cellulose into an aqueous alkali solution is markedly lower than the rate of dissolution of cellulose into an aqueous cuprammonium solution or an aqueous Cadoxen solution. Therefore, when cellulose is added to an aqueous alkali solution and the resultant mixture is allowed to stand still without stirring, the dissolution of the cellulose apparently stops, so that the dissolution ratio (Sc) of the cellulose becomes only less than 50%. Therefore, it is necessary to promote the dissolution of the cellulose by stirring. In general, if the stirring is performed by means of a mixer or the like capable of stirring at a high speed, the dissolution rate can be increased. However, when a high speed stirring is performed, even if the average temperature of the whole system is kept at 10° C. or less, a local heat generation occurs, so that the stability of the resultant cellulose dope is decreased and gelation is likely to occur. Further, with respect to the cellulose in an aqueous alkali solution, the higher the temperature of the cellulose, the lower the solubility of the cellulose becomes. Therefore, it is not preferred that the temperature of a cellulose slurry is elevated due to a local heat generation accompanying a high speed stirring. For these reasons, in the present invention, it is required that the stirring of a cellulose slurry be performed at a low speed.

The cellulose slurries of Examples 1 to 4 satisfy the above-mentioned formula (4). This means that, with respect to the cellulose slurries of Examples 1 to 4, even if the viscosity average degree of polymerization (DPc) of the cellulose is increased, the viscosity of the slurry does not increase. Accordingly, by using any of the cellulose slurries of Examples 1 to 4, a cellulose dope which is stable and unlikely to exhibit gelation can be obtained.

On the other hand, in each of Comparative Examples 1 to 4 (in each of which a water/cellulose slurry was obtained by subjecting to wet pulverization the cellulose dispersed in an aqueous medium containing no sodium hydroxide), $k_2$ of the above-mentioned formula (4) was 0.8, i.e., a positive value. This means that a homogeneous dissolution of the cellulose of the slurry is difficult. Therefore, the dissolution ratio (Sc) of the cellulose in the resultant cellulose/sodium hydroxide aqueous solution (cellulose dope) is poor. This poor property becomes marked especially in the case of the dissolution of cellulose having a high DPc. Further, in each of Comparative Examples 1 to 4, the cellulose in the slurry exhibited a non-crystallinity ($\chi am$) of 0.45, suggesting that the movement of the cellulose molecular skeleton itself is restricted. For easy reference, the formula (4) is shown below again:

$$\sigma_T = K_2 + k_2 DPc \qquad (4)$$

wherein:
$\sigma_T$ represents the yield stress (Pa) of the slurry,
$K_2$ represents an arbitrary constant (Pa),
$k_2$ is 0 or less (Pa), and
DPc represents the viscosity average degree of polymerization of the cellulose in the slurry.

EXAMPLES 5 TO 8 AND COMPARATIVE EXAMPLE 5

In each of Examples 5 to 8, with respect to each cellulose slurry, the relationship between the yield stress ($\sigma_T$) and the sodium hydroxide concentration ($C_{Na}$) is examined and shown.

A sulfite process dissolving pulp (manufactured and sold by Nippon Paper Industries Co., Ltd., Japan) was hydrolyzed by means of an aqueous sulfuric acid solution, thereby obtaining cellulose having a DPc value of 600. The obtained cellulose was mixed with sodium hydroxide so that four aqueous mixtures were obtained each of which had a cellulose solids content of 10.5% by weight and which respectively had sodium hydroxide concentration ($C_{Na}$) values of 0.5% by weight, 2% by weight, 3% by weight and 5% by weight. The obtained four aqueous mixtures were individually subjected to wet pulverization by using a stirred medium wet grinding apparatus (APEX MILL AM-1, manufactured and sold by KOTOBUKI Engineering and Manufacturing Co., Ltd., Japan) for 6 minutes, thereby obtaining alkali/cellulose slurries each containing particulate cellulose having an average particle diameter of 10 to 13 μm. The obtained alkali/cellulose slurries had $C_{Na}$ values of 0.5% by weight, 2% by weight, 3% by weight and 5% by weight, and these were, respectively, identified as the slurries of Examples 5 to 8.

The relationship between the yield stress ($\sigma_T$) and the sodium hydroxide concentration ($C_{Na}$) of each of the obtained alkali/cellulose slurries was examined. It was found that $k_1$ of the above-mentioned formula (2) was −0.16, i.e., a negative value. Further, with respect to the non-crystallinity χam represented by the above-mentioned formula (3), which is an index of the freedom of the movement of the cellulose molecular skeleton, the celluloses in the slurries of Examples 5 to 8 respectively had non-crystallinity (χam) values of 0.54, 0.59, 0.61 and 0.62, i.e., values which are each more than 0.5. As shown in Examples 1 to 4, the fact that the non-crystallinity χam is more than 0.5 and $k_1$ of the formula (2) is a negative value shows that the cellulose molecular skeleton is easily movable. When the configuration entropies before and after the dissolution are also taken into consideration, it is believed that the above fact suggests that the celluloses in these slurries can be easily dissolved.

As Comparative Example 5, the following experiment was conducted. In substantially the same manner as in Examples 5 to 8, a sulfite process dissolving pulp (manufactured and sold by Nippon Paper Industries Co., Ltd., Japan) was hydrolyzed by means of an aqueous sulfuric acid solution, thereby obtaining cellulose having a DPc value of 600. The obtained cellulose was mixed with sodium hydroxide so that four aqueous mixtures were obtained each of which had a cellulose solids content of 10.5% by weight and which respectively had sodium hydroxide concentrations of 0.5% by weight, 2% by weight, 3% by weight and 5% by weight. The obtained four aqueous mixtures were individually stirred using a stirrer (T. K. HOMO-MIXER, manufactured and sold by TOKUSHU KIKA KOGYO Co., Ltd., Japan), thereby obtaining alkali/cellulose slurries having the same compositions as the cellulose slurries of Examples 5 to 8. The relationship between the yield stress ($\sigma_T$) and the sodium hydroxide concentration ($C_{Na}$) of each of the obtained alkali/cellulose slurries was examined. It was found that $k_1$ of the formula (2) was 0.11, i.e., a positive value. Further, with respect to each of the obtained alkali/cellulose slurries, it was found that the non-crystallinity χam of the cellulose was less than 0.5 and, hence, the movement of the cellulose molecular skeleton was restricted, suggesting that the dissolution performance was poor.

COMPARATIVE EXAMPLE 6

A sulfite process dissolving pulp (ALAPUL-T, manufactured and sold by ALASKA PULP Co., Ltd., U.S.A.) was mixed with sodium hydroxide so that two aqueous mixtures were obtained each of which had a cellulose solids content of 3% by weight and which respectively had sodium hydroxide concentration ($C_{Na}$) values of 2% by weight and 4% by weight. The obtained two aqueous mixtures were individually subjected to pulverization by using a grinder (SUPERGRINDEL, manufactured and sold by MASUKO SANGYO Co., Ltd., Japan) under grinding conditions wherein the rotor revolution rate is 1,500 rpm, the clearance between the grindstones is 40 μm and the grinding operation is conducted 5 times, thereby obtaining alkali/cellulose slurries. The obtained alkali/cellulose slurries were individually concentrated by using a centrifugal dehydrator until the cellulose solids content of each slurry became 8.5% by weight. Then, it was attempted to measure the yield stress ($\sigma_T$) of each of the resultant concentrated slurries. However, any of these concentrated slurries was a solid-like product exhibiting almost no fluidity. Therefore, it was impossible to measure their viscosities. It is considered that the reason why these concentrated slurries exhibited a solid-like state is because microfibrils formed a network structure, thereby markedly increasing the viscosity. As mentioned above, the pulverization of cellulose is classified into a pulverization wherein cellulose fibers are cut into particles (as conducted in the present invention) and a pulverization wherein cellulose fibers are caused to undergo fibrillation (as conducted in this Comparative Example 6). In the case of the fibrillation, the fibrils form a network structure, so that the resultant suspension has markedly high viscosity and, hence, exhibits a gel state even when the solids content is low. When it is attempted to dissolve the cellulose contained in such a high viscosity cellulose suspension, it is difficult to mix such a high viscosity cellulose suspension with an aqueous sodium hydroxide solution as a solvent. Therefore, such a high viscosity cellulose suspension is unsuitable for use as a cellulose slurry for the preparation of a cellulose dope.

To the above-obtained concentrated slurries (cellulose slurries which had been individually concentrated to a cellulose solids content of 8.5% by weight) was added an aqueous sodium hydroxide solution, thereby adjusting the compositions of the cellulose slurries so that each slurry had a cellulose content (Cc) of 5% by weight and a $C_{Na}$ (sodium hydroxide concentration) value of 7.6% by weight, wherein this operation was conducted in the same manner as in Example 15 described below. The resultant mixtures were individually subjected to dissolution operation for the cellulose (preparation of a dope) in the same manner as in Example 15 described below, thereby obtaining cellulose/sodium hydroxide aqueous solutions (cellulose dopes). However, the dissolution ratios (Sc) of the celluloses in the obtained cellulose dopes were only 96% or less and, hence, the dissolution performance was markedly poor. With respect to the zero-shear viscosities ($\eta_0$) of these cellulose/sodium hydroxide aqueous solutions (dopes), one dope (prepared by the method in which the aqueous mixture subjected to the pulverization had a sodium hydroxide concentration ($C_{Na}$) of 2% by weight) exhibited a zero-shear viscosity ($\eta_0$) of 52,000 mPa·s, and the other dope (prepared by the method in which the aqueous mixture subjected to the pulverization had a sodium hydroxide concentration ($C_{Na}$) of 4% by weight) exhibited a zero-shear viscosity ($\eta_0$) of 44,000 mPa·s. Therefore, these dopes exhibited high viscosities which do not satisfy the above formula (1).

EXAMPLES 9 TO 15 AND COMPARATIVE EXAMPLES 7 TO 18

Figure 3:
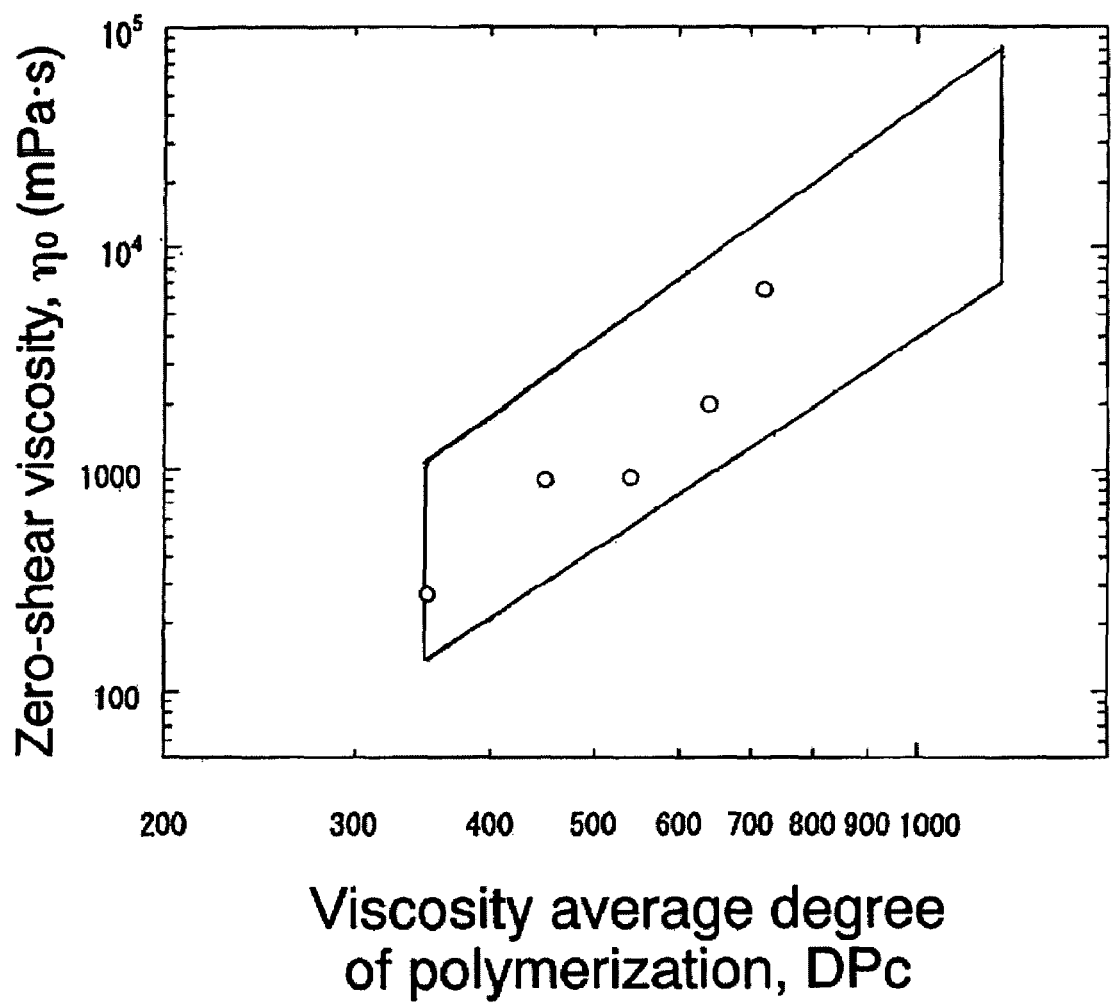
FIG. 3 is a graph showing that the cellulose dopes produced in Examples 9, 11, 12, 14 and 15 exhibit zero-shear viscosity ($\eta_0$) values which satisfy formula (1) which is shown below.

In substantially the same manner as in Examples 1 to 4, cellulose slurries which respectively had DPc values of 350, 450, 540, 640 and 720 (and each of which had a sodium hydroxide concentration of 2% by weight) were obtained. These cellulose slurries were cooled to 0° C. To the cooled cellulose slurries respectively having DPc values of 350, 450, 540, 640 and 720 was added an aqueous sodium hydroxide solution which had a sodium hydroxide concentration of 15.6% by weight and which had been kept at −10° C., thereby adjusting the compositions of the slurries so that each slurry had a cellulose content (Cc) of 5% by weight and a $C_{Na}$ (sodium hydroxide concentration) value of 7.6% by weight. To the same cellulose slurries respectively having DPc values of 350 and 540 as employed above was added an aqueous sodium hydroxide solution which had a sodium hydroxide concentration of 33.7% by weight and which had been kept at −10° C., thereby adjusting the compositions of the slurries so that each slurry had a cellulose content (Cc) of 7% by weight and a $C_{Na}$ (sodium hydroxide concentration) value of 7.6% by weight. Then, these 7 cellulose slurries were individually stirred using a low speed stirring type kneader (twin-screw kneader) under stirring conditions wherein the stirring is performed at −4° C. for 10 min at a shear rate of 500/sec and a stirring speed of 15 m/min in terms of the speed at which the outer end of an agitating element of the stirrer is rotated, thereby obtaining 7 cellulose dopes including:

5 cellulose dopes each of which had a cellulose content (Cc) value of 5% by weight, a sodium hydroxide concentration ($C_{Na}$) value of 7.6% by weight and which respectively had DPc values of 350, 450, 540, 640 and 720 (respectively as Examples 9, 11, 12, 14 and 15; see Table 2); and 2 cellulose dopes each of which had a cellulose content (Cc) value of 7% by weight, a sodium hydroxide concentration ($C_{Na}$) value of 7.6% by weight and which respectively had DPc values of 350 and 540 (respectively as Examples 10 and 13; see Table 3). With respect to the cellulose dopes having DPc values of 450, 640 and 720, experiments in which the Cc value is adjusted to 7% by weight were not carried out. The dissolution ratio (Sc) of the cellulose in each of the obtained cellulose dopes was 99.0% by weight or more and, hence, the dissolution performance was good. The results are shown in Tables 2 and 3. These cellulose dopes of Examples 9 to 15 each exhibited a zero-shear viscosity ($\eta_0$) which satisfies the formula (1). As an example, the relationship between the DPc and $\eta_0$ of the cellulose dopes having a cellulose content (Cc) of 5% by weight is shown in FIG. 3. In FIG. 3, the region surrounded by solid lines corresponds to the range which satisfies the formula (1). As shown in FIG. 3, any of the $\eta_0$ values of the cellulose dopes of Examples 9, 11, 12, 14 and 15 falls inside of the region surrounded by the solid lines. In addition, when these cellulose dopes were allowed to stand still at 10° C., their zero-shear viscosities ($\eta_0$) did not change for one week or more and hence these dopes were stable.

As Comparative Examples 7 to 9, the cellulose slurries obtained in Examples 1, 3 and 4, which respectively had DPc values of 350, 540 and 720, were subjected to the dissolution of the cellulose (preparation of a dope) in substantially the same manner as described in connection with production of the dopes of Examples 9 to 15, except that the Cc (cellulose content) of the dope was changed to 3% by weight. With respect to each of the obtained cellulose dopes of Comparative Examples 7 to 9, the zero-shear viscosity ($\eta_0$) was measured. As shown in Table 1 (see the column for Comparative Examples 7 to 9 in Table 1), the zero-shear viscosities ($\eta_0$) of these cellulose dopes did not satisfy the formula (1). For easy reference, the formula (1) is shown below again:

$$\eta_0 = kCc^m \times DPc^p \quad (1)$$

wherein:

$\eta_0$ represents the zero-shear viscosity (mPa·s) of the cellulose dope,

Cc represents the cellulose content (% by weight) of the cellulose dope,

DPc represents the viscosity average degree of polymerization of the cellulose in the cellulose dope, $k = 3.9 \times 10^{-11}$, m is a number of from 5 to 7, and p is a number of from 3 to 4.

Further, in the NMR analysis of the cellulose dope having a DPc value of 350 and a Cc value of 5% by weight (Example 9), the cellulose dope having a DPc value of 540 and a Cc value of 5% by weight (Example 12) and the cellulose dope having a DPc value of 720 and a Cc value of 5% by weight (Example 15), the 6-position carbon atoms (C6) of the glucose units of the celluloses respectively exhibited longitudinal relaxation time ($\tau c6$) values of 140, 150 and 190 ms, and the 1-position carbon atoms (C1) of the glucose units of the celluloses respectively exhibited longitudinal relaxation time ($\tau c1$) values of 300, 300 and 520 ms.

In Comparative Examples 10 to 17, the cellulose slurries obtained in Comparative Examples 1, 3 and 4 (water/cellulose slurries obtained by effecting wet pulverization of cellulose in an aqueous medium containing no sodium hydroxide) (wherein the cellulose slurries respectively had DPc values of 350, 540 and 720) were cooled to 0° C. To the cooled cellulose slurries respectively having DPc values of 350, 540 and 720 was added an aqueous sodium hydroxide solution which had a sodium hydroxide concentration of 11.7% by weight and which had been kept at −10° C., thereby adjusting the compositions of the slurries so that each slurry had a cellulose content (Cc) of 3% by weight and a $C_{Na}$ (sodium hydroxide concentration) value of 7.6% by weight. To the same cooled cellulose slurries respectively having DPc values of 350, 540 and 720 as employed above was added an aqueous sodium hydroxide solution which had a sodium hydroxide concentration of 18.5% by weight and which had been kept at −10° C., thereby adjusting the compositions of the slurries so that each slurry had a cellulose content (Cc) of 5% by weight and a $C_{Na}$ (sodium hydroxide concentration) value of 7.6% by weight. To the same cooled cellulose slurries respectively having DPc values of 350 and 540 as employed above was added an aqueous sodium hydroxide solution which had a sodium hydroxide concentration of 43.1% by weight and which had been kept at −10° C., thereby adjusting the compositions of the slurries so that each slurry had a cellulose content (Cc) of 7% by weight and a $C_{Na}$ (sodium hydroxide concentration) value of 7.6% by weight. Then, these 8 cellulose slurries were individually subjected to a high speed stirring under stirring conditions wherein the stirring is performed at a shear rate of 17,000/sec and a stirring speed of 1,020 m/min in terms of the speed at which the outer end of an agitating element of the stirrer is rotated, thereby obtaining 8 cellulose dopes (the cellulose dopes of Comparative Examples 10 to 17; see Tables 1 to 3). As shown in Tables 1 to 3 (see the columns for Comparative Examples 10 to 17 in Tables 1 to 3), the zero-shear viscosities ($\eta_0$) of these cellulose dopes did not satisfy the formula (1). Of these cellulose dopes, any one which had a DPc value of 350 or more and a cellulose content (Cc) of 5% by weight or more exhibited a zero-shear viscosity ($\eta_0$) which is higher than the range satisfying the formula (1), and this indicates that gelation proceeds immediately after the dissolution of the cellulose (preparation of a dope). For example, in the case of the cellulose dope having a DPc value of 540 and a Cc value of 7% by weight (Comparative Example 15), the $\eta_0$ value thereof immediately after the dissolution (preparation) was 49,000 mPa·s; however, gelation occurred one day after the dissolution (preparation), losing the solution state.

Further, in the NMR analysis of the cellulose dope having a DPc value of 720 and a cellulose content (Cc) value of 5% by weight (Comparative Example 17), the 6-position carbon atoms (C6) of the glucose units of the cellulose exhibited a longitudinal relaxation time ($\tau c6$) of 410 ms, and the 1-position carbon atoms (C1) of the glucose units of the cellulose exhibited a longitudinal relaxation time ($\tau c1$) of 170 ms, suggesting that the movement of the main chain of the cellulose molecule is markedly restricted and, hence, the dissolution performance is not good.

In addition, in Comparative Example 18, the following experiment was conducted. A cellulose/sodium hydroxide suspension which had the same composition as the cellulose slurry used in Example 15, i.e., a cellulose slurry having a DPc value of 720 and a sodium hydroxide concentration of 2% by weight (containing particulate cellulose having an average particle diameter of 45 μm) was prepared. The cellulose slurry was not subjected to wet pulverization. In an attempt to obtain a cellulose/sodium hydroxide aqueous solution (dope) having a cellulose content (Cc) of 5% by weight, the cellulose slurry was subjected to a high speed stirring in the same manner as in Comparative Examples 10 to 17. However, a vigorous gelation occurred during the stirring and, hence, a cellulose/sodium hydroxide aqueous solution (dope) was not able to be obtained.

TABLE 1

Cc: 3% by weight

| | Range satisfying the formula (1) (mPa·s) | Dope prepared from alkali/cellulose slurry $\eta_0$ (mPa·s) | Dope prepared from water/cellulose slurry $\eta_0$ (mPa·s) |
|---|---|---|---|
| DPc = 350 | 5 to 39 | 60 (x) (Comparative Example 7) | 80 (x) (Comparative Example 10) |
| DPc = 540 | 22 to 180 | 220 (x) (Comparative Example 8) | 240 (x) (Comparative Example 13) |
| DPc = 720 | 55 to 493 | 700 (x) (Comparative Example 9) | 1300 (x) (Comparative Example 16) |

(○: satisfying the formula (1)
x: not satisfying the formula (1))
(A good shaped article cannot be obtained from a dope having a Cc value of less than 5% by weight.)

TABLE 2

Cc: 5% by weight

| | Range satisfying the formula (1) (mPa·s) | Dope prepared from alkali/cellulose slurry $\eta_0$ (mPa·s) | Dope prepared from water/cellulose slurry $\eta_0$ (mPa·s) |
|---|---|---|---|
| DPc = 350 | 137 to 1093 | 270 (○) (Example 9) Stable for one week or more | 1520 (x) (Comparative Example 11) Gelation occurred one week after preparation |
| DPc = 450 | 305 to 2634 | 910 (○) (Example 11) Stable for one week or more | — |
| DPc = 540 | 547 to 4986 | 920 (○) (Example 12) Stable for one week or more | 5500 (x) (Comparative Example 14) Gelation occurred one week after preparation |
| DPc = 640 | 943 to 9036 | 2050 (○) (Example 14) Stable for one week or more | — |
| DPc = 720 | 1374 to 13647 | 6500 (○) (Example 15) Stable for one week or more | 50000 (x) (Comparative Example 17) Gelation occurred one week after preparation |

(○: satisfying the formula (1)
x: not satisfying the formula (1))

TABLE 3

Cc: 7% by weight

| | Range satisfying the formula (1) (mPa·s) | Dope prepared from alkali/cellulose slurry $\eta_0$ (mPa·s) | Dope prepared from water/cellulose slurry $\eta_0$ (mPa·s) |
|---|---|---|---|
| DPc = 350 | 1138 to 9737 | 1500 (○) (Example 10) Stable for one week or more | 18000 (x) (Comparative Example 12) Gelation occurred one week after preparation |
| DPc = 540 | 4559 to 44420 | 6750 (○) (Example 13) Stable for one week or more | 49000 (x) (Comparative Example 15) Gelation occurred one day after preparation |

(○: satisfying the formula (1)
x: not satisfying the formula (1))

EXAMPLES 16 TO 18 AND COMPARATIVE EXAMPLE 19

In Examples 16 to 18, the influence of $C_{Na}$ on the dissolution of cellulose is examined and shown.

The cellulose slurries obtained in Examples 5, 7 and 8, each of which has a cellulose solids content of 10.5% by weight and which respectively have $C_{Na}$ values of 0.5% by weight, 3% by weight and 5% by weight, were cooled to 0° C. To these cooled cellulose slurries respectively having $C_{Na}$ values of 0.5% by weight, 3% by weight and 5% by weight were, respectively, added aqueous sodium hydroxide solutions which respectively had sodium hydroxide concentrations of 21.8% by weight, 16.8% by weight and 12.8% by weight and which had been kept at −10° C., thereby adjusting the compositions of the three cellulose slurries so that each slurry had a cellulose content of 7% by weight and a $C_{Na}$ (sodium hydroxide concentration) value of 7.6% by weight. Then, the cellulose slurries were individually subjected to a low speed stirring by using a stirrer (T. K. HOMO-MIXER, manufactured and sold by TOKUSHU KIKA KOGYO Co., Ltd., Japan) under stirring conditions wherein the stirring is performed at −4° C. for 10 min at a shear rate of 2,000/sec and a stirring speed of 120 m/min in terms of the speed at which the outer end of an agitating element of the stirrer is rotated, thereby obtaining three cellulose dopes. The cellulose dopes produced from the cellulose slurries respectively having $C_{Na}$ values of 0.5% by weight, 3% by weight and 5% by weight were, respectively, identified as the cellulose dopes of Examples 16, 17 and 18.

The dissolution ratio (Sc) of the cellulose in each of the cellulose dopes of Examples 16, 17 and 18 was 99.0% by weight or more and, hence, the dissolution performance was good. These cellulose dopes each exhibited a zero-shear viscosity ($\eta_0$) which satisfies the formula (1). These dopes were stable for one week or more. With respect to other indexes of the dissolution performance, i.e., the longitudinal relaxation time ($\tau c6$) exhibited by the 6-position carbon atoms (C6) of the glucose units of the cellulose and the longitudinal relaxation time ($\tau c1$) exhibited by the 1-position carbon atoms (C1) of the glucose units of the cellulose, the celluloses of the cellulose dopes exhibited favorable values.

In Comparative Example 19, a slurry having a $C_{Na}$ value of 6.5% by weight was produced in the same manner as in the production of the cellulose slurries used in Examples 16 to 18. From the cellulose slurry, a cellulose dope having a cellulose content of 7% by weight and a $C_{Na}$ value of 7.6% by weight was prepared in substantially the same manner as in Examples 16 to 18.

The dope obtained in Comparative Example 19 exhibited a zero-shear viscosity ($\eta_0$) which was higher than the range satisfying the formula (1), and this indicates that the dope is likely to exhibit gelation. Actually, the dope obtained in Comparative Example 19 was unstable, and gelation occurred only one day after the preparation of the dope. Further, both $\tau c6$ and $\tau c1$ values were unfavorable.

The data of Examples 16 to 18 and Comparative Example 19 are shown in Table 4.

TABLE 4

| $C_{Na}$ (% by weight) | $\eta_0$ (mPa · s) | Stability of dope | Longitudinal relaxation time (ms) | |
|---|---|---|---|---|
| | | | $\tau c6$ | $\tau c1$ |
| 0.5 (Example 16) | 25000 | Stable for one week or more | 180 | 300 |
| 3 (Example 17) | 11800 | Stable for one week or more | 140 | 450 |
| 5 (Example 18) | 19500 | Stable for one week or more | 170 | 370 |
| 6.5 (Comparative Example 19) | 46000 | Gelation occurred one day after preparation | 560 | 190 |

EXAMPLES 19 TO 22

In each of Examples 19 to 22, the influence of a reagent (additive) on the dissolution of cellulose is examined and shown.

A sulfite process dissolving pulp (manufactured and sold by Nippon Paper Industries Co., Ltd., Japan) was hydrolyzed by the steam explosion method, thereby obtaining cellulose. The obtained cellulose was mixed with sodium hydroxide so that the resultant aqueous mixture had a cellulose solids content of 10.5% by weight and a $C_{Na}$ (sodium hydroxide concentration) value of 4% by weight. The obtained aqueous mixture was subjected to wet pulverization by using a stirred medium wet grinding apparatus (APEX MILL AM-1, manufactured and sold by KOTOBUKI Engineering and Manufacturing, Co., Ltd., Japan) for 6 minutes, thereby obtaining a cellulose slurry containing particulate cellulose having a DPc value of 540 and an average particle diameter of 12 μm. 190.48 g of the obtained cellulose slurry was placed in a 300 ml beaker and cooled to 0° C. To the cooled cellulose slurry was added 59.52 g of an aqueous sodium hydroxide solution which had a sodium hydroxide concentration of 19.12% by weight and which contained the below-mentioned additive (the amount of additive: 0.1 mole/mole of glucose units) and which had been kept at −10° C., thereby adjusting the composition of the slurry so that the slurry had a weight of 250 g, a cellulose content of 8% by weight and a $C_{Na}$ (sodium hydroxide concentration) value of 7.6% by weight and that the amount of the additive became 0.1 mole/mole of glucose units. Then, the cellulose slurry was subjected to a low speed stirring by using a stirrer (T. K. HOMO-MIXER, manufactured and sold by TOKUSHU KIKA KOGYO Co., Ltd., Japan) under stirring conditions wherein the stirring is performed at −4° C. for 10 min at a shear rate of 2,000/sec and a stirring speed of 120 m/min in terms of the speed at which the outer end of an agitating element of the stirrer is rotated, thereby obtaining a cellulose dope. As the above-mentioned additive, acrylonitrile, acrylamide, carbon disulfide and propylene oxide were individually employed, and the cellulose dopes containing them were, respectively, identified as Examples 19, 20, 21 and 22.

The results are shown in Table 5.

TABLE 5

| Additive | Zero-shear viscosity, $\eta_0$ (mPa · s) | Stability of dope |
|---|---|---|
| Acrylonitrile (Example 19) | 25000 | Stable for one week or more |
| Acrylamide (Example 20) | 30000 | Stable for one week or more |
| Carbon disulfide (Example 21) | 12000 | Stable for one week or more |
| Propylene oxide (Example 22) | 29000 | Stable for one week or more |

Range of the zero-shear viscosity ($\eta_0$) satisfying the formula (1) (mPa · s): 10573 to 105810

EXAMPLES 23 AND 24 AND COMPARATIVE EXAMPLES 20 AND 21

An example of the production of a fiber as a cellulose shaped article is shown.

Sodium hydroxide was added to a sulfite process dissolving pulp (manufactured and sold by Nippon Paper Industries Co., Ltd., Japan) so that the resultant aqueous mixture had a cellulose solids content of 8.5% by weight and a $C_{Na}$ (sodium hydroxide concentration) value of 4% by weight. The obtained aqueous mixture was subjected to wet pulverization by using a stirred medium wet grinding apparatus (APEX MILL AM-1, manufactured and sold by KOTOBUKI Engineering and Manufacturing Co., Ltd., Japan) for 6 minutes, thereby obtaining a cellulose slurry containing particulate cellulose having a DPc value of 720 and an average particle diameter of 12 μm. The obtained cellulose slurry was cooled to 0° C. To 10 parts by weight of the cooled cellulose slurry was added 7 parts by weight of an aqueous sodium hydroxide solution which had a sodium hydroxide concentration of 12.75% by weight and which had been kept at −10° C., thereby adjusting the composition of the cellulose slurry so that the slurry had a cellulose content of 5% by weight and a sodium hydroxide concentration of 7.6% by weight. Then, the cellulose slurry was subjected to stirring by using a low speed stirring type kneader (twin-screw kneader) under stirring conditions wherein the stirring is performed at −4° C. for 10 min at a shear rate of 500/sec and a stirring speed of 15 m/min in terms of the speed at which the outer end of an agitating element of the stirrer is rotated, thereby obtaining a cellulose dope having a cellulose content of 5% by weight and a sodium hydroxide concentration of 7.6% by weight.

The obtained cellulose/sodium hydroxide aqueous solution (dope) was subjected to deaeration under vacuum, and then to spinning by the following method. The dope was discharged through a spinneret nozzle having 100 holes (each having 0.08 mm Ø) into a 25 cm length bath containing an aqueous 25% by weight sulfuric acid solution at −5° C., at a discharge rate of 30.2 ml/min (a discharge speed of 60 m/min), thereby coagulating the dope in the aqueous sulfuric acid solution, while taking up the resultant fibrous body (fiber) at a take up speed of 60 m/min. The obtained fiber was subjected to water washing and then drying using a heat roll at 120° C., and wound around a reel at a rate of 60 m/min. This fiber was identified as the fiber of Example 23. Substantially the same procedure as described above (Example 23) was repeated except that the discharge rate of the dope was change to 50.3 ml/min (a discharge speed of 100 m/min), and the coagulation, water washing and drying were conducted while taking up the formed fiber at a take up speed of 100 m/min. The obtained fiber was identified as the fiber of Example 24.

For comparison, the following experiments were conducted. A pulp was subjected to steam treatment for 4 minutes by using saturated steam at a pressure of 8.5 kg/cm², thereby obtaining a hydrolyzed pulp. The hydrolyzed pulp was subjected to wet pulverization under the same conditions as described above, thereby obtaining a cellulose slurry containing particulate cellulose having a DPc value of 310. Then, with respect to the obtained cellulose slurry, the dissolution of the cellulose (preparation of a dope) and the spinning of the dope were conducted in substantially the same manner as described in connection with production of the fibers of Examples 23 and 24 (i.e., substantially the same procedures as in Examples 23 and 24 were repeated except that the above-obtained cellulose slurry containing particulate cellulose having a DPc value of 310 was employed). These comparative experiments respectively for comparison with Examples 23 and 24 were, respectively, identified as Comparative Examples 20 and 21.

The strengths and elongations of the obtained fibers are shown in Table 6.

TABLE 6

| | Example 23 | Example 24 | Comparative Example 20 | Comparative Example 21 |
| --- | --- | --- | --- | --- |
| Take up speed | 60 m/min | 100 m/min | 60 m/min | 100 m/min |
| Strength (g/d) | 2.6 | 2.9 | 1.5 | Spinning was impossible because of fiber breakage |
| Elongation (%) | 16.8 | 13.1 | 11.8 | Spinning was impossible because of fiber breakage |

The fibers of Examples 23 and 24, which were obtained from dopes having a high DPc value, exhibited strengths exceeding 2 g/d (denier). By contrast, the fiber of Comparative Example 20, which was obtained from a dope having a low DPc value, exhibited a low strength (1.5 g/d). This value (1.5 g/d) is lower than the strength of a regular viscose rayon.

In Comparative Example 21, the strength of the gel fiber being coagulated was too low, so that a spinning while taking up at a take up speed of 100 m/min was not able to be conducted. In the production of a regular viscose filament, the take up speed of 100 m/min is a lowest level of take up speed, and use of a take up speed lower than 100 m/min is impractical from the viewpoint of productivity.

EXAMPLES 25 TO 27 AND COMPARATIVE EXAMPLES 22 AND 23

An example of the production of a flat film as a cellulose shaped article is shown.

In substantially the same manner as in Examples 9, 12 and 15, dopes which respectively had DPc values of 350, 540 and 720 and each of which had a cellulose content of 5% by weight and a sodium hydroxide concentration of 7.6% by weight were obtained. (These dopes were, respectively, identified as the dopes of Examples 25, 26 and 27.) For comparison, dopes respectively having DPc values of 200 and 310 were obtained in substantially the same manner as mentioned above. (These dopes were, respectively, identified as the dopes of Comparative Examples of 22 and 23.)

Figure 2:
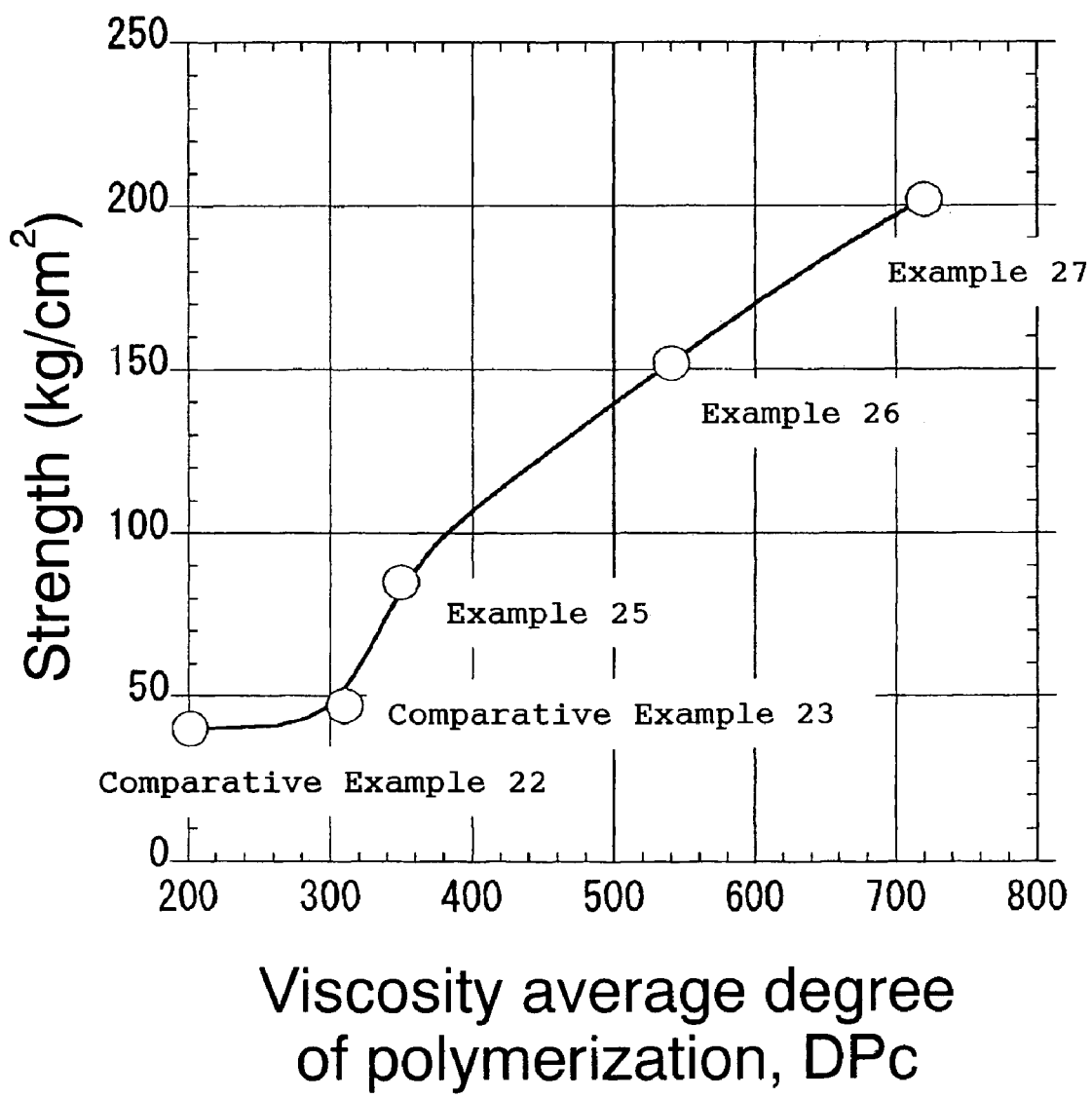
FIG. 2 is a graph showing the relationship between the viscosity average degrees of polymerization (DPc) of the celluloses which are used in Examples 25 to 27 and Comparative Examples 22 and 23 and the strengths of gel films which are produced in Examples 25 to 27 and Comparative Examples 22 and 23 (hereinafter, each of the celluloses used in Examples 25 to 27 is referred to as an "alkali/cellulose slurry" and each of the celluloses used in Comparative Examples 22 and 23 is referred to as an "water/cellulose slurry")

Each of the obtained dopes was individually subjected to deaeration under vacuum, and then individually cast on a glass plate so that the resultant dope film had a thickness of 500 μm. The formed dope films were subjected to coagulation for 5 minutes by means of an aqueous 25% by weight sulfuric acid solution at −5° C. and then fully washed with water to thereby obtain gel films. The strengths of the obtained gel films were measured. The results obtained with respect to Examples 25, 26 and 27 and Comparative Examples 22 and 23 are shown in FIG. 2. The films obtained from the dopes of Comparative Examples 22 and 23 (dopes respectively having DPc values of 200 and 310) both had strengths as low as 40 kg/cm² or less. With respect to cellulose shaped articles having such a low level of gel strength, it is difficult to produce the shaped articles (such as fibers and films) in high productivity on a commercial scale. Further, in some cases, commercial-scale production of such low strength shaped articles requires use of a special apparatus (as disclosed in Unexamined Japanese Patent Application Laid-Open Specification No. 7-278941) which enables a considerable lowering of the tension sustained by cellulose shaped articles during the production process thereof. As seen from Example 25, when the DPc value was increased to 350, the gel strength sharply increased to a level which is about 2 times the strength achieved at the DPc value of 310. Further, as seen from Example 27, the gel strength achieved at the DPc value of 720 was 4 times the strength achieved at the DPc value of 310.

The same dope as the dope of Example 27 (having a DPc value of 720) was subjected to deaeration under vacuum, and then cast on a glass plate so that the resultant dope film had a thickness of 500 μm. The dope film was subjected to drying by heating until the water content thereof became 5% by weight or less to thereby coagulate the dope. The resultant was washed with water and dried to obtain a film. The strength of the obtained film was more than 1,800 kg/cm², which is a value by far higher than the strength of a regular cellophane film.

EXAMPLES 28 TO 30

An example of the production of a flat film from a dope containing incorporated therein a polysaccharide or a polypeptide is shown.

Sodium hydroxide was added to a sulfite process dissolving pulp (CELLUNIER-F, manufactured and sold by Rayonier, U.S.A.) so that the resultant aqueous mixture had a cellulose solids content of 8.5% by weight and a $C_{Na}$ (sodium hydroxide concentration) value of 2% by weight. The obtained aqueous mixture was subjected to wet pulverization by using a stirred medium wet grinding apparatus (APEX MILL AM-1, manufactured and sold by KOTOBUKI Engineering and Manufacturing Co., Ltd., Japan) for 6 minutes, thereby obtaining a cellulose slurry containing particulate cellulose having a DPc value of 620 and an average particle diameter of 10 μm. To the obtained slurry were individually added starch, casein and collagen to thereby obtain three types of mixtures. The obtained three types of mixtures were cooled to 0° C. To each of the cooled mixtures was added an aqueous sodium hydroxide solution which had a sodium hydroxide concentration of 30% by weight and which had been kept at −10° C., thereby adjusting the compositions of the mixtures so that the mixtures each had a cellulose content of 4% by weight, a starch content, casein content or collagen content of 4% by weight and a sodium hydroxide concentration of 7.6% by weight. Then, the mixtures were subjected to a low speed stirring by using a stirrer (T. K. HOMO-MIXER, manufactured and sold by TOKUSHU KIKA KOGYO Co., Ltd., Japan) under stirring conditions wherein the stirring is performed at −4° C. for 10 min at a shear rate of 2,000/sec and a stirring speed of 120 m/min in terms of the speed at which the outer end of an agitating element of the stirrer is rotated, thereby obtaining three types of dopes. The dopes respectively containing starch, casein and collagen were, respectively, identified as the dopes of Examples 28, 29 and 30. Each of the obtained three types of dopes was individually subjected to deaeration under vacuum, and then individually cast on a glass plate so that the resultant dope film had a thickness of 500 μm. The formed dope films were subjected to coagulation for 5 minutes by means of an aqueous 25% by weight sulfuric acid solution at −5° C., and then washed with water and dried to thereby obtain flat films. The film of Example 28 containing starch, the film of Example 29 containing casein and the film of Example 30 containing collagen respectively exhibited dry strengths of 1,100 kg/cm², 770 kg/cm² and 1,050 kg/cm². All of the three films had excellent flexibility and excellent palatableness.

EXAMPLE 31 AND COMPARATIVE EXAMPLE 24

An example of the production of a tubular film as a cellulose shaped article is shown.

Sodium hydroxide was added to a sulfite process dissolving pulp (DERIVAT LV-U, manufactured and sold by BORREGAARD, Norway) so that the resultant aqueous mixture had a cellulose solids content of 8.5% by weight and a $C_{Na}$ (sodium hydroxide concentration) value of 4% by weight. The obtained aqueous mixture was subjected to wet pulverization by using a stirred medium wet grinding apparatus (APEX MILL AM-1, manufactured and sold by KOTOBUKI Engineering and Manufacturing Co., Ltd., Japan) for 6 minutes, thereby obtaining a cellulose slurry containing particulate cellulose having a DPc value of 660 and an average particle diameter of 11 μm. The obtained cellulose slurry was cooled to 0° C. To the cooled cellulose slurry was added an aqueous sodium hydroxide solution which had a sodium hydroxide concentration of 16.2% by weight and which had been kept at −10° C., thereby adjusting the composition of the cellulose slurry so that the slurry had a cellulose content of 6% by weight and a sodium hydroxide concentration of 7.6% by weight. Then, the cellulose slurry was subjected to a low speed stirring by using a stirrer (T. K. HOMO-MIXER, manufactured and sold by TOKUSHU KIKA KOGYO Co., Ltd., Japan) under stirring conditions wherein the stirring is performed at −4° C. for 10 min at a shear rate of 2000/sec and a stirring speed of 120 m/min in terms of the speed at which the outer end of an agitating element of the stirrer is rotated, thereby obtaining a dope. From the obtained dope, a tubular film was produced by the following method. The obtained dope was discharged through an annular slit nozzle which was provided in a bath containing an outside coagulation liquid and which was directed toward the upside so that the dope was discharged vertically upwardly into the outside coagulation liquid at a discharge linear velocity of 15 m/min, thereby coagulating the discharged dope in the bath, while taking up the resultant coagulated tubular film upwardly at a take up speed of 30 m/min. The diameter of the annular slit nozzle was 20 mm and the width of the slit was 500 μm. The outside coagulation liquid was an aqueous 25% by weight sulfuric acid solution kept at −5° C. At the central portion of the annular slit nozzle was provided an internal pipe which extended upwardly up to a level which was a little higher than the liquid level of the outside coagulation liquid bath, wherein an inside coagulation liquid was introduced from the downside into an annular space vertically extending between the outer wall of the internal pipe and the inner wall of the tubular film being coagulated, so that the outer and inner walls of the tubular film being formed are in contact with the outside and inside coagulation liquids, respectively. The inside coagulation liquid ascended up to the upper end of the internal pipe, and then overflowed into the inside of the internal pipe and was allowed to fall down to be discharged through the internal pipe. Since the level of the upper end of the internal pipe is higher than the liquid level of the outside coagulation liquid bath (wherein the outside coagulation liquid is in contact with the outer wall of the tubular film being formed), the level of the inside coagulation liquid becomes higher than the liquid level of the outside coagulation liquid bath (wherein the outside coagulation liquid is in contact with the outer wall of the tubular film being formed). Consequently, at the upper portion of the tubular film which is positioned at a level higher than the liquid level of the outside coagulation liquid bath, the tubular film being formed becomes a little expanded by the from-inside-toward-outside pressure which is exerted by the inside coagulation liquid on the inner wall of the tubular film being formed. By this method for the production of a film, it is possible to improve the isotropy of the molecular orientation of the cellulose of the film obtained. The tubular film which had been coagulated by neutralization was washed with water and then dried. The drying step was conducted under conditions wherein pressurized air is kept in the inside of the tubular film. By this drying operation, a film having more improved isotropic molecular orientation can be obtained. The obtained tubular film was identified as the tubular film of Example 31. The tubular film of Example 31 had a strength of 1,470 kg/cm² in the direction of the film formation and a strength of 1,340 kg/cm² in the direction from the center to the circumference of the tubular film. In Comparative Example 24, an attempt was made to produce a tubular film from a dope having a DPc value of 310. However, since the strength of the gel film during the coagulation step was low, the production of the film was not able to be stably conducted.

EXAMPLES 32 AND 33 AND COMPARATIVE EXAMPLE 25

An example of the production of a sponge as a cellulose shaped article is shown.

A cellulose dope was produced in the same manner as in the above-mentioned example of the production of a tubular film. The temperature of 300 g of the obtained dope was adjusted to 10° C., and thereto were added 4 g of polyester fibers having an average fiber length of 5 mm and a thickness of 1 denier and either 500 g of Glauber's salt having an average particle diameter of 3 mm (as Example 32) or 500 g of sodium metasilicate nonahydrate ($Na_2SiO_3.9H_2O$) (as Example 33), followed by kneading. Each of the resultant kneaded mixtures was individually shaped into a block, and subjected to gelation at 90° C., and then to neutralization with an aqueous sulfuric acid solution, followed by water washing and drying, thereby obtaining a sponge. The obtained sponges were, respectively, identified as the sponges of Examples 32 and 33. As Comparative Example 25, a sponge was produced in substantially the same manner as described above except that a dope having a DPc value of 310 was used. The sponges of Examples 32 and 33, having a high DPc value, exhibited satisfactory strength even in a wet state. By contrast, when the sponge of Comparative Example 25 was in a wet state, the sponge was easily torn and hence found to be unsuitable for practical use.

EXAMPLES 34 TO 36 AND COMPARATIVE EXAMPLES 26 AND 27

An example of the production of a coating as a cellulose shaped article is shown.

A cellulose dope was produced in the same manner as in the above-described example of the production of a tubular film. The obtained dope was roll-coated on a high density paper sheet (substrate) having a density of 250 g/m$^2$ so that the dope was coated in an amount of 5% by weight in terms of the weight of the cellulose, based on the weight of the substrate paper. The resultant dope-coated high density paper sheet was subjected to drying by means of a heat roll at 90° C. to thereby coagulate the dope on the paper sheet, and then to neutralization with an aqueous 20% by weight sulfuric acid solution at 20° C., followed by water washing and then drying using a heat roll at 90° C., thereby obtaining a cellulose-coated paper sheet. This cellulose-coated paper sheet was identified as the cellulose-coated article of Example 34. The results of Example 34 are shown in Table 7.

The cellulose-coated article of Example 34 exhibited a water permeability which is only about 1/10,000 of the water permeability of the original non-coated high density paper sheet. That is, the cellulose coating greatly reduced the water permeability of the high density paper sheet. This water permeability of the cellulose-coated article is considerably smaller than the water permeability (about 1 to 5 liters/(m$^2$·hr·kg/cm$^2$)) of a commercially available reverse osmosis membrane. This means that the cellulose-coated article of Example 34 exhibits a substantially complete water barrier property. This cellulose-coated article also exhibited an excellent gas barrier property. Specifically, this cellulose-coated article exhibited an oxygen permeability of only 40 cc/m$^2$/24 hr/atm, as measured at 23° C. and a relative humidity of 65%. This cellulose-coated article also exhibited a very excellent oil resistance. Specifically, when the oil resistance of this cellulose-coated article was measured in accordance with the TAPPI RC-338 method, the article exhibited a Kit value of 12 or more, indicating that the article exhibits a highest level of oil resistance. The surface of this cellulose-coated article exhibited a slight hydrophobicity, and exhibited a contact angle of 55° with water.

A paper cup was prepared from the cellulose-coated article of Example 34. Even when hot water was poured into the prepared paper cup, no bad smell was perceived. Since this cellulose-coated article exhibited excellent properties in that the water permeability is low, the imperviousness to an oil (such as an edible oil) is high, the oxygen barrier property is high, and no bad smell is generated, the cellulose-coated article can be applied to in the food-related fields, such as food packaging materials and trays. As Comparative Example 26, substantially the same procedure as in Example 34 was repeated except that a cellulose/sodium hydroxide aqueous solution having a DPc value of 310 was used as a coating material. With respect to water impermeability, oil resistance and oxygen barrier property, the cellulose-coated article of Comparative Example 26 exhibited substantially the same properties as those of the cellulose-coated article of Example 34. However, since the cellulose used in Comparative Example 26 had a low DPc value, it exhibited low strength. Specifically, when the cellulose-coated article of Comparative Example 26 was rubbed in water, the cellulose coating came off in the form of small flakes. Therefore, the cellulose-coated article of Comparative Example 26 cannot be practically used.

The same dope as used in Example 34 was coated on a kraft paper sheet having a density of 50 g/m$^2$ by means of a gravure coater so that the dope was coated in an amount of 0.2% by weight in terms of the weight of the cellulose, based on the weight of the substrate paper. The resultant dope-coated paper sheet was subjected to drying at 90° C. to thereby coagulate the dope on the paper sheet, and, then, the resultant was thoroughly washed with water (as Example 35) or subjected to neutralization of the alkali values with an aqueous citric acid solution (as Example 36). Then, the resultant was again subjected to drying, to obtain a cellulose-coated article. In any of Example 35 and Example 36, the obtained cellulose-coated article exhibited a Kit value of 12 or more, indicating that the article exhibits a highest level of oil resistance. As shown in Examples 35 and 36, the amount of the coating on the article may be small. In addition, as shown in Example 36, water washing is not necessary. Therefore, there is an advantage in that the coating can be performed by means of an ordinary gravure coater. In Comparative Example 27, the oil resistance of an oil resistant paper (density: 54 g/m$^2$) (manufactured and sold by Oji Paper Co., Ltd., Japan) was measured by the same method as mentioned above. The commercially available oil resistant paper was found to exhibit a Kit value of 9, showing that the oil resistance of the oil resistant paper is lower than the oil resistances of the cellulose-coated articles of Examples 35 and 36.

The data of Examples 34 to 36 and Comparative Examples 26 and 27 are shown in Table 7.

TABLE 7

| | Amount of coating (% based on the weigh of substrate paper) | Water permeability (liter/ atm · m² · hr) | Kit value | Oxygen permeability (ml/ atm · m² · 24 hr) | Abrasion resistance in water |
|---|---|---|---|---|---|
| High density paper | — | 1360 | 1 or less | — | — |
| Example 34 | 5 | 0.10 | 12 or more | 40 | ○ |
| Example 35 | 0.2 | 100 | 12 or more | — | ○ |
| Example 36 | 0.2 | 125 | 12 or more | — | ○ |
| Comparative Example 26 | 5 | 0.16 | 12 or more | 110 | X |
| Comparative Example 27 (oil resistant paper manufactured and sold by Oji Paper Co., Ltd.) | — | — | 9 | — | — |

INDUSTRIAL APPLICABILITY

The cellulose dope of the present invention is stable and free from gelation even when the cellulose dope has a high content of cellulose having a relatively high degree of polymerization (DPc). By the use of the cellulose dope of the present invention, a regenerated cellulose shaped article (such as a fibrous body, a flat film, a tubular film, a hollow fiber, a particle, a sponge body or a coating) which has a mechanical strength sufficient for practical use can be easily and stably produced without using a large amount of a poisonous substance (such as carbon disulfide or cuprammonium) and without using special molding apparatus. Therefore, the cellulose dope of the present invention is commercially very advantageous.

The invention claimed is:

1. A cellulose dope comprising an aqueous sodium hydroxide solution and cellulose dissolved in said solution, said cellulose dope having a sodium hydroxide concentration ($C_{Na}$) of from 6.5 to 11% by weight, a cellulose content (Cc) of from 5 to 10% by weight, a viscosity average degree of polymerization (DPc) of said cellulose of from 350 to 1,200 and a cellulose dissolution ratio (Sc) of 99.0% by weight or more,
wherein a zero-shear viscosity ($\eta_0$) of said cellulose dope measured by a viscometer is within the range defined by the following formula (1):

$$\eta_0 = kCc^m \times DPc^p \quad (1)$$

wherein:
$\eta_0$ represents the zero-shear viscosity (mPa·s) of the cellulose dope,
Cc represents the cellulose content (% by weight) of the cellulose dope,
DPc represents the viscosity average degree of polymerization of the cellulose in the cellulose dope,
$k = 3.9 \times 10^{-11}$,
m is a number of from 6.3 to 6.5, and
p is a number of from 3.2 to 3.5,
said cellulose dope being produced by a method which comprises:

(1) providing a cellulose slurry comprising an aqueous sodium hydroxide solution and, dispersed therein, particulate cellulose having an average particle diameter of 30 μm or less,
said cellulose slurry being achieved by wet pulverization in a stirred medium wet grinding apparatus, and having a sodium hydroxide concentration of from 0.5 to less than 6.5% by weight and a cellulose content of 5% by weight or more,
(2) adjusting the sodium hydroxide concentration of the cellulose slurry to 6.5 to 11% by weight, and
(3) stirring the cellulose slurry at 10° C. or less by means of a stirrer under stirring conditions satisfying at least one requirement selected from the group consisting of the requirement that the stirring is performed at a shear rate of 9,000/sec or less and the requirement that the stirring is performed at a stirring speed of 500 m/min or less in terms of the speed at which the outer end of an agitating element of the stirrer is rotated,
said steps (2) and (3) being conducted in the order of step (2) and step (3) or simultaneously,
thereby causing the particulate cellulose to be dissolved in the cellulose slurry to the extent that the cellulose has a dissolution ratio (Sc) of 99.0% by weight or more, to obtain a cellulose dope,
wherein said cellulose slurry satisfies the following formula (2):

$$\sigma_T = K_1 \exp(k_1 C_{Na}) \quad (2)$$

wherein:
$\sigma_T$ represents the yield stress (Pa) of said slurry,
$K_1$ represents an arbitrary constant (Pa),
$k_1$ is 0 or less, and
$C_{Na}$ is the sodium hydroxide concentration (% by weight) of said slurry, and
wherein, in the solid state NMR analysis of said slurry, the cellulose in said slurry exhibits a non-crystallinity ($\chi$am) of 0.5 or more, said non-crystallinity being defined by the following formula (3):

$$\chi am = I_{high}/(I_{high} + I_{low}) \quad (3)$$

wherein:
$\chi$am is the non-crystallinity of the cellulose in said slurry, and
$I_{high}$ and $I_{low}$ respectively represent the ratios of the areas of the peaks in a solid state NMR spectrum of said slurry, wherein the peaks are, respectively, ascribed to the higher magnetic field component and lower magnetic field component of the 4-position carbon atoms of the glucose units of the cellulose in said slurry, and wherein separation between said peaks respectively ascribed to the higher magnetic field component and the lower magnetic field component is made using a method in which each of said peaks is approximated to the Gaussian distribution function.

2. The cellulose dope according to claim 1, wherein, in the NMR analysis of the cellulose dope, the 6-position carbon atoms of the glucose units of the cellulose exhibit a longitudinal relaxation time ($\tau$c) of from 10 to 400 ms, and the 1-position carbon atoms of the glucose units of the cellulose exhibit a longitudinal relaxation time ($\tau$c) of from 200 to 10,000 ms.

3. The cellulose dope according to claim 2, wherein, in the NMR analysis of the cellulose dope, the 6-position carbon atoms of the glucose units of the cellulose exhibit a longitudinal relaxation time ($\tau$c) of from 10 to 200 ms.

4. The cellulose dope according to claim 1, wherein the hydroxyl groups of the cellulose are partially modified by reaction with a reagent which is reactive with a hydroxyl group in the presence of an alkali, wherein said reagent is selected from the group consisting of a vinyl compound, an etherification agent and a xanthation agent.

5. The cellulose dope according to claim 4, wherein said reagent is used in an amount of 0.1 mole or less per mole of glucose units in the cellulose.

6. The cellulose dope according to claim 1, wherein said cellulose slurry satisfies the following formula (4):

$$\sigma_T = K_2 + k_2 DPc \qquad (4)$$

wherein:
$\sigma_T$ represents the yield stress (Pa) of said slurry,
$K_2$ represents an arbitrary constant (Pa),
$k_2$ is 0 or less (Pa), and
DPc represents the viscosity average degree of polymerization of the cellulose in said slurry.

7. The cellulose dope according to claim 1, wherein said cellulose in said cellulose slurry has an average particle diameter of 20 µM or less.

8. The cellulose dope according to claim 1, wherein said method further comprises, at a point in time which is after step (1) and before the end of step (3), adding to the cellulose slurry a reagent which is reactive with a hydroxyl group in the presence of an alkali, wherein said reagent is selected from the group consisting of a vinyl compound, an etherification agent and a xanthation agent.

9. The cellulose dope according to claim 8, wherein said reagent is used such that the amount of the reagent is 0.1 mole or less per mole of glucose units in the cellulose in said cellulose slurry.

10. A cellulose shaped article obtained by subjecting the cellulose dope of claim 1 to at least one coagulation treatment selected from the group consisting of drying coagulation, gelation coagulation and neutralization coagulation.

11. The cellulose shaped article according to claim 10, wherein the cellulose dope contains at least one additive selected from the group consisting of a polysaccharide, a polypeptide and a natural resin.

12. The cellulose shaped article according to claim 10, which is a fibrous body, a flat film, a tubular film, a hollow fiber, a particle, a sponge body or coating.

13. A cellulose slurry comprising an aqueous sodium hydroxide solution and, dispersed therein, particulate cellulose having an average particle diameter of 30 µm or less,
said cellulose slurry being achieved by wet pulverization in a stirred medium wet grinding apparatus, and having a sodium hydroxide concentration of from 0.5 to less than 6.5% by weight and a cellulose content of 5% by weight or more,
wherein said cellulose slurry satisfies the following formula (2):

$$\sigma_T = K_1 \exp(k_1 C_{Na}) \qquad (2)$$

wherein:
$\sigma_T$ represents the yield stress (Pa) of said slurry,
$K_1$ represents an arbitrary constant (Pa),
$k_1$ is 0 or less, and
$C_{Na}$ is the sodium hydroxide concentration (% by weight) of said slurry, and
wherein, in the solid state NMR analysis of said slurry, the cellulose in said slurry exhibits a non-crystallinity ($\chi$am) of 0.5 or more, said non-crystallinity being defined by the following formula (3):

$$\chi am = I_{high}/(I_{high} + I_{low}) \qquad (3)$$

wherein:
$\chi$am is the non-crystallinity of the cellulose in said slurry, and
$I_{high}$ and $I_{low}$ respectively represent the ratios of the areas of the peaks in a solid state NMR spectrum of said slurry, wherein the peaks are, respectively, ascribed to the higher magnetic field component and lower magnetic field component of the 4-position carbon atoms of the glucose units of the cellulose in said slurry, and wherein separation between said peaks respectively ascribed to the higher magnetic field component and the lower magnetic field component is made using a method in which each of said peaks is approximated to the Gaussian distribution function.

14. The cellulose slurry according to claim 13, which satisfies the following formula (4):

$$\sigma_T = K_2 + k_2 DPc \qquad (4)$$

wherein:
$\sigma_T$ represents the yield stress (Pa) of said slurry,
$K_2$ represents an arbitrary constant (Pa),
$k_2$ is 0 or less (Pa), and
DPc represents the viscosity average degree of polymerization of the cellulose in said slurry.

15. The cellulose slurry according to claim 13 or 14, wherein said cellulose has an average particle diameter of 20 µm or less.

16. A method for producing the cellulose dope of claim 1, which comprises:
(1) providing a cellulose slurry comprising an aqueous sodium hydroxide solution and, dispersed therein, particulate cellulose having an average particle diameter of 30 µm or less,
said cellulose slurry having a sodium hydroxide concentration of from 0.5 to less than 6.5% by weight and a cellulose content of 5% by weight or more,
(2) adjusting the sodium hydroxide concentration of the cellulose slurry to 6.5 to 11% by weight, and
(3) stirring the cellulose slurry at 10° C. or less by means of a stirrer under stirring conditions satisfying at least one requirement selected from the group consisting of the requirement that the stirring is performed at a shear rate of 9,000/sec or less and the requirement that the stirring is performed at a stirring speed of 500 m/min or less in terms of the speed at which the outer end of an agitating element of the stirrer is rotated,
said steps (2) and (3) being conducted in the order of step (2) and step (3) or simultaneously,
thereby causing the particulate cellulose to be dissolved in the cellulose slurry to the extent that the cellulose has a dissolution ratio of 99.0% by weight or more, to obtain a cellulose dope,
wherein said cellulose slurry satisfies the following formula (2):

$$\sigma_T = K_1 \exp(k_1 C_{Na}) \qquad (2)$$

wherein:
$\sigma_T$ represents the yield stress (Pa) of said slurry,
$K_1$ represents an arbitrary constant (Pa),
$k_1$ is 0 or less, and
$C_{Na}$ is the solution hydroxide concentration (% by weight) of said slurry, and wherein, in the solid state NMR analysis of said slurry, the cellulose in said slurry exhibits a non-crystallinity ($\chi$am) of 0.5 or more, said non-crystallinity being defined by the following formula (3):

$$\chi am = I_{high}/(I_{high} + I_{low}) \qquad (3)$$

wherein:

χam is the non-crystallinity of the cellulose in said slurry, and $I_{high}$ and $I_{low}$ respectively represent the ratios of the areas of the peaks in a solid state NMR spectrum of said slurry, wherein the peaks are, respectively, ascribed to the higher magnetic field component and lower magnetic field component of the 4-position carbon atoms of the glucose units of the cellulose in said slurry, and wherein separation between said peaks respectively ascribed to the higher magnetic field component and the lower magnetic field component is made using a method in which each of said peaks is approximated to the Gaussian distribution function.

17. The method according to claim 16, wherein said cellulose slurry satisfies the following formula (4):

$$\sigma_T = K_2 + k_2 DPc \quad (4)$$

wherein:

$\sigma_T$ represents the yield stress (Pa) of said slurry, $K_2$ represents an arbitrary constant (Pa), $k_2$ is 0 or less (Pa), and DPc represents the viscosity average degree of polymerization of the cellulose in said slurry.

18. The method according to claim 16 or 17, wherein said cellulose in said cellulose slurry has an average particle diameter of 20 μm or less.

19. The method according to claim 16 or 17, wherein the hydroxyl groups of said cellulose in said cellulose slurry are partially modified by reaction with a reagent which is reactive with a hydroxyl group in the presence of an alkali.

20. The method according to claim 16 or 17, which further comprises, at a point in time which is after step (1) and before the end of step (3), adding to the cellulose slurry a reagent which is reactive with a hydroxyl group in the presence of an alkali.

21. The method according to claim 19, wherein said reagent is selected from the group consisting of an etherification agent and a xanthation agent.

22. The method according to claim 19, wherein said reagent is used such that the amount of the reagent is 0.1 mole or less per mole of glucose units in the cellulose in said cellulose dope.

* * * * *